(12) United States Patent
Amano

(10) Patent No.: US 10,816,777 B2
(45) Date of Patent: Oct. 27, 2020

(54) IMAGING OPTICAL SYSTEM, PROJECTION-TYPE DISPLAY APPARATUS, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 450 days.

(21) Appl. No.: 15/602,949

(22) Filed: May 23, 2017

(65) Prior Publication Data
US 2017/0343778 A1    Nov. 30, 2017

(30) Foreign Application Priority Data

May 25, 2016 (JP) .................................. 2016-104122

(51) Int. Cl.
*G02B 13/04* (2006.01)
*G02B 13/22* (2006.01)
(Continued)

(52) U.S. Cl.
CPC ............... *G02B 13/04* (2013.01); *G02B 7/04* (2013.01); *G02B 13/16* (2013.01); *G02B 13/22* (2013.01);
(Continued)

(58) Field of Classification Search
CPC ... G02B 7/02; G02B 7/04; G02B 7/10; G02B 7/105; G02B 13/00; G02B 13/0095; G02B 13/04; G02B 13/06; G02B 13/16; G02B 13/18; G02B 13/22; G02B 15/00; G02B 15/14; G02B 15/15; G02B 15/16; G02B 15/177; G02B 17/00; G02B 17/008;
(Continued)

(56) References Cited

U.S. PATENT DOCUMENTS

2004/0021953 A1    2/2004  Betensky et al.
2005/0036207 A1*   2/2005  Yamasaki ............ G02B 15/177
                                                359/676
(Continued)

FOREIGN PATENT DOCUMENTS

JP    H11-287951 A    10/1999
JP    2006-512595 A    4/2006
(Continued)

OTHER PUBLICATIONS

An Office Action mailed by the Japanese Patent Office dated May 28, 2019, which corresponds to Japanese Patent Application No. 2016-104122 and is related to U.S. Appl. No. 15/602,949.
An Office Action mailed by the Japanese Patent Office dated Jan. 7, 2020, which corresponds to Japanese Patent Application No. 2016-104122 and is related to U.S. Appl. No. 15/602,949.

*Primary Examiner* — Thomas K Pham
*Assistant Examiner* — Ibrahima Diedhiou
(74) *Attorney, Agent, or Firm* — Studebaker & Brackett PC

(57) ABSTRACT

In the imaging optical system that consists of a first optical system and a second optical system in order from a magnified side, and has an intermediate image formed between the first optical system and the second optical system, a focus group moving during focusing is included between a most magnified side of the first optical system and a position at which a principal ray of light having a maximum angle of view and an optical axis of the first optical system intersect each other, and a predetermined conditional expression relating to the focus group is satisfied.

21 Claims, 12 Drawing Sheets

(51) Int. Cl.
*G02B 7/04* (2006.01)
*G02B 13/16* (2006.01)
*G02B 17/08* (2006.01)
*G02B 27/00* (2006.01)
*G03B 21/14* (2006.01)
*G02B 17/02* (2006.01)

(52) U.S. Cl.
CPC ..... *G02B 17/0896* (2013.01); *G02B 27/0025* (2013.01); *G03B 21/142* (2013.01); *G02B 17/023* (2013.01)

(58) Field of Classification Search
CPC ...... G02B 17/02; G02B 17/023; G02B 17/08; G02B 17/0896; G02B 27/00; G02B 27/0025; G02B 27/646; G03B 21/00; G03B 21/005; G03B 21/14; G03B 21/142; G03B 21/28
USPC ....... 359/354, 362, 364–366, 380, 432, 434, 359/642, 648, 649, 663, 676, 683, 684, 359/694, 705, 726, 728, 739, 740, 98, 99
See application file for complete search history.

(56) References Cited

U.S. PATENT DOCUMENTS

| | | | |
|---|---|---|---|
| 2005/0088762 A1* | 4/2005 | Ohashi | G02B 13/06 359/754 |
| 2009/0034097 A1 | 2/2009 | Yakita | |
| 2014/0036142 A1* | 2/2014 | Inoko | G02B 3/00 348/369 |
| 2015/0103403 A1 | 4/2015 | Oe et al. | |

FOREIGN PATENT DOCUMENTS

| | | |
|---|---|---|
| JP | 2006-330410 A | 12/2006 |
| JP | 2009-036844 A | 2/2009 |
| JP | 2011-033738 A | 2/2011 |
| JP | 2012-141637 A | 7/2012 |
| JP | 2015-152764 A | 8/2015 |
| WO | 2014/045596 A1 | 3/2014 |

\* cited by examiner

EXAMPLE 1

EXAMPLE 3

EXAMPLE 4

FIG. 5
EXAMPLE 1
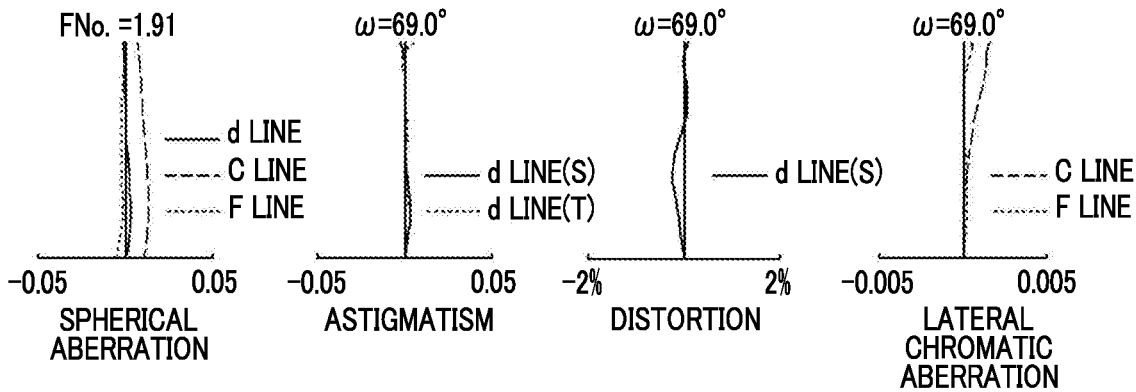
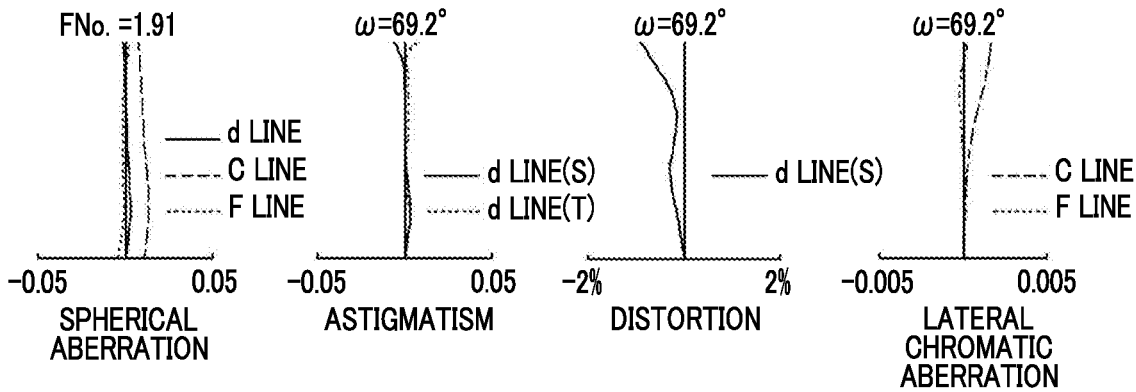
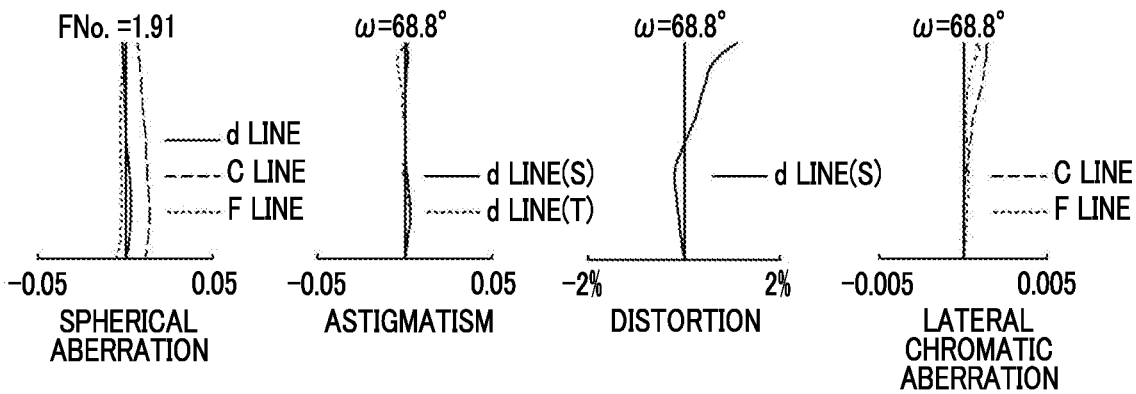

FIG. 6
EXAMPLE 2
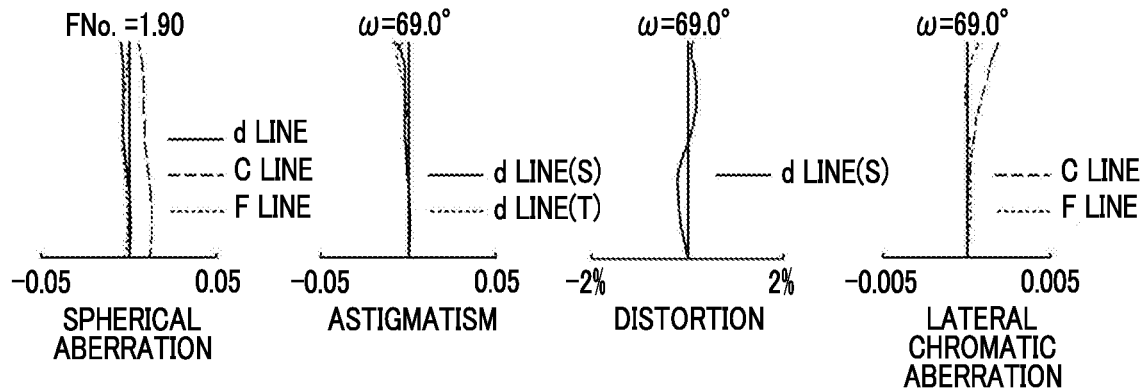
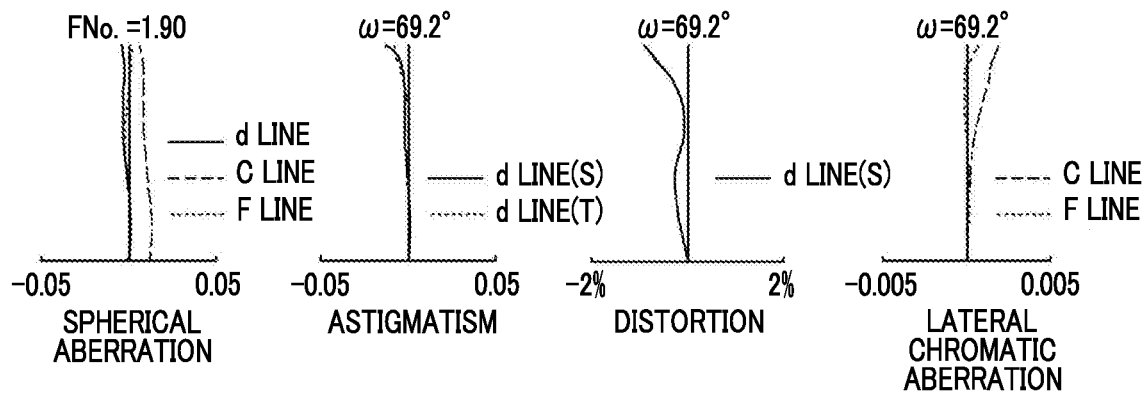
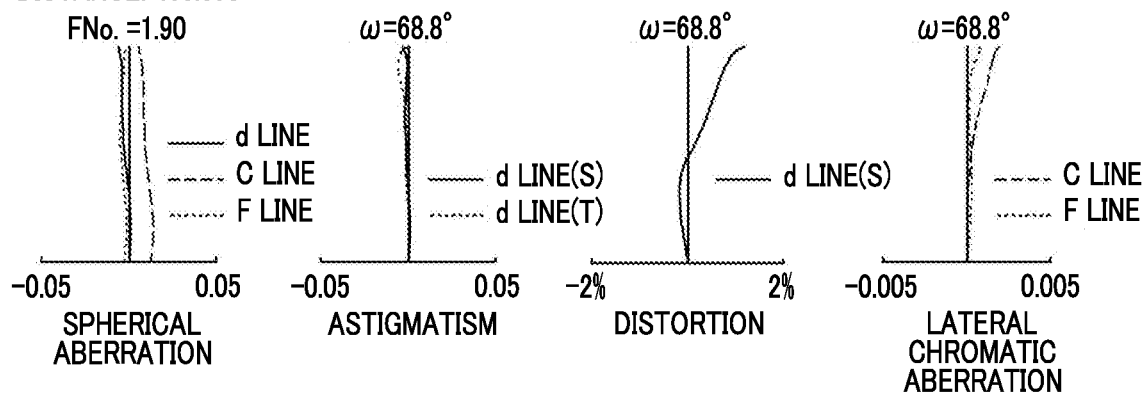

FIG. 8
EXAMPLE 4
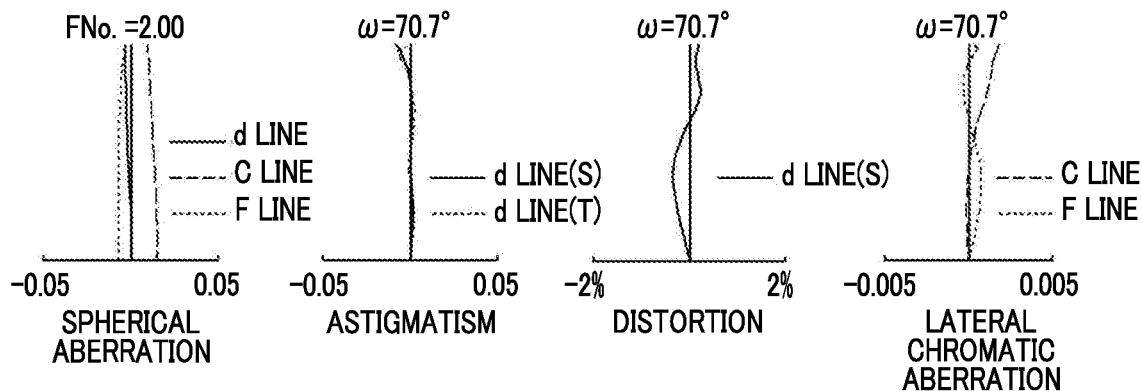
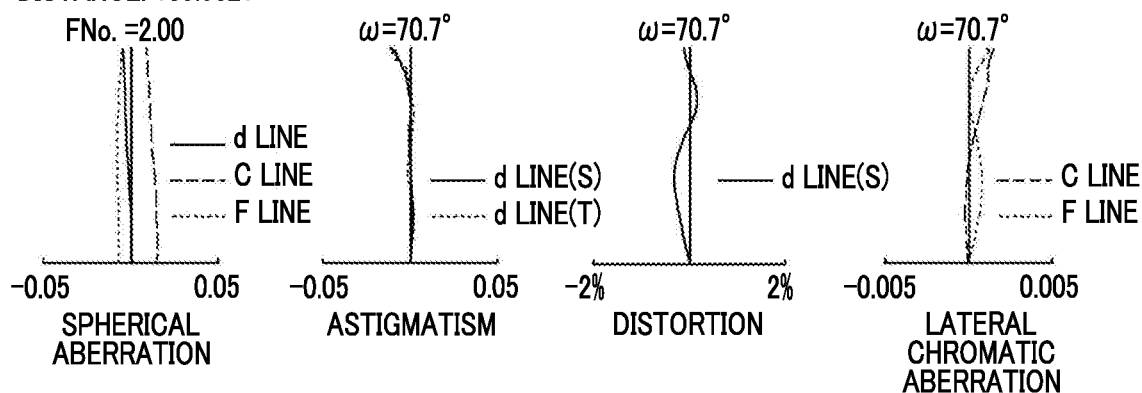
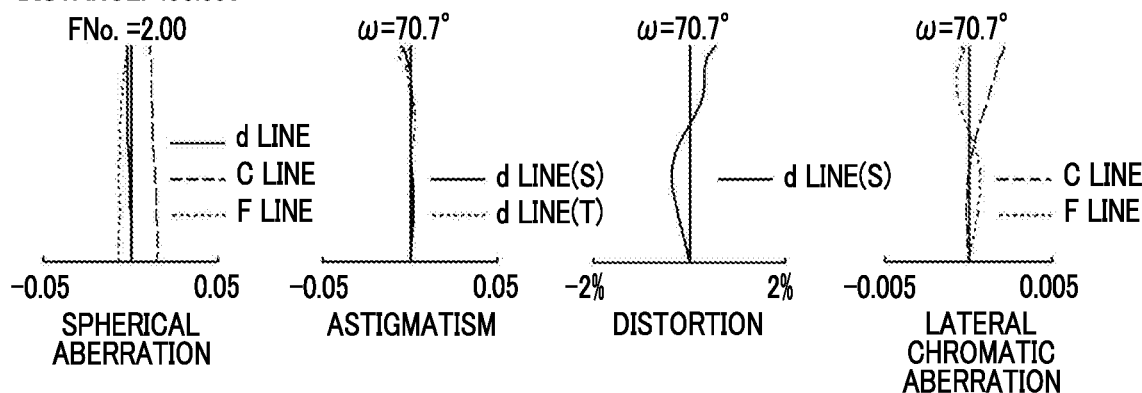

IMAGING OPTICAL SYSTEM, PROJECTION-TYPE DISPLAY APPARATUS, AND IMAGING APPARATUS

CROSS REFERENCE TO RELATED APPLICATIONS

The present application claims priority under 35 U.S.C. § 119 to Japanese Patent Application No. 2016-104122 filed on May 25, 2016. The above application is hereby expressly incorporated by reference, in its entirety, into the present application.

BACKGROUND OF THE INVENTION

1. Field of the Invention

The present invention relates particularly to an imaging optical system which is suitably used for a projection-type display apparatus having a light valve such as a liquid crystal display device or a Digital Micromirror Device (DMD: Registered Trademark) mounted therein, a projection-type display apparatus including this imaging optical system, and an imaging apparatus including this imaging optical system.

2. Description of the Related Art

In recent years, projection-type display apparatuses (also called projectors), such as a liquid crystal display device or a DMD, having a light valve mounted therein have been in widespread use and have increased in performance.

In addition, with the recent improvement in the performance of a light valve, an imaging optical system which is combined with the light valve has required satisfactory aberration correction appropriate for the resolution of the light valve. Further, in consideration of use in a relatively narrow indoor space for the purpose of presentation or the like, an imaging optical system having a wider angle is strongly demanded.

Besides, there has been a requirement for no great change in the image quality of a projected image despite a change in projection distance, that is, a small fluctuation in the distance of an imaging optical system. However, in a case where an increase in angle proceeds by reducing a focal length, image plane curvature caused by the distance fluctuation is likely to occur.

Therefore, in order to respond to such a demand, an imaging optical system is proposed in which an intermediate image is formed in a reduced-side optical system consisting of a plurality of lenses, and the image is re-formed likewise in a magnified-side optical system consisting of a plurality of lenses (see JP2006-330410A and JP2015-152764A).

In an imaging optical system constituted by only an optical system having no normal intermediate image formed thereon, in a case where an attempt is made to widen an angle by reducing a focal length, lenses on the magnified side become excessively large in any way. However, in the imaging optical system of an intermediate imaging type as described above, it is possible to shorten the back focus of the magnified-side optical system, and to reduce the magnified-side lens diameters of the magnified-side optical system. Therefore, the system is also suitable for widening an angle by reducing a focal length.

SUMMARY OF THE INVENTION

However, since aberration corrections are independently performed in the reduced-side optical system and the magnified-side optical system using an intermediate image as a boundary, the optical system disclosed in JP2006-330410A does not attain to a wide angle of a level required in these days or does not propose a solution to a distance fluctuation. In addition, since the optical system disclosed in JP2015-152764A forms an intermediate image within the optical system, and performs focusing by moving three groups, an increase in cost associated with an increase in the number of parts is a problem in addition to the complication of a focusing mechanism.

The present invention is contrived in view of such circumstances, and an object thereof is to provide an imaging optical system, having high performance, in which image plane curvature based on focusing is satisfactorily corrected with a wide angle while suppressing cost, in an imaging optical system having an intermediate image formed therein, a projection-type display apparatus including this imaging optical system, and an imaging apparatus including this imaging optical system.

According to a first aspect of the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a focus group moving along an optical axis of the first optical system during focusing is included between a most magnified side of the first optical system and a position at which a principal ray of light having a maximum angle of view and the optical axis of the first optical system intersect each other, and the following Conditional Expression (1) is satisfied, $$10.0 < |fA/f| < 500.0 \quad (1)$$

where fA is a focal length of a lens moving during focusing (which is equivalent to a focal length of a focus group, and is set to a composite focal length of the entire focus group in a case where the focus group consists of a plurality of lenses), and f is a focal length of the whole system.

In the imaging optical system according to the first aspect of the present invention, it is preferable to satisfy the following Conditional Expression (1-1).

$$20.0 < |fA/f| < 200.0 \quad (1-1)$$

In addition, in the imaging optical system according to the first aspect of the present invention, it is preferable that the focus group consists of one single lens.

According to a second aspect of the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a section between a most magnified side of the first optical system and a position at which a principal ray of light having a maximum angle of view and an optical axis of the first optical system intersect each other consists of a first lens group having a negative refractive power and a second lens group, having a positive refractive power, which consists of two single lenses, in order from the magnified side, focusing is performed by moving any one single lens out of the two single lenses of the second lens group along the optical axis of the first optical system, and the following Conditional Expression (1) is satisfied, $$10.0<|fA/f|<500.0 \tag{1}$$

where fA is a focal length of a lens moving during focusing, and f is a focal length of the whole system.

In the imaging optical system according to the second aspect of the present invention, it is preferable to satisfy the following Conditional Expression (1-1).

$$20.0<|fA/f|<200.0 \tag{1-1}$$

In addition, in the imaging optical system according to the second aspect of the present invention, it is preferable to satisfy the following Conditional Expressions (2) and (3), and more preferable to satisfy the following Conditional Expressions (2) and (3) and then satisfy the following Conditional Expression (2-1) and/or (3-1), $$-3.0<f21/|f|<-1.0 \tag{2}$$

$$-2.0<f21/|f|<-1.2 \tag{2-1}$$

$$5.0<f22/|f|<20.0 \tag{3}$$

$$7.0<f22/|f|<15.0 \tag{3-1}$$

where f21 is a focal length of the first lens group, f22 is a focal length of the second lens group, and f is a focal length of the whole system.

In addition, in the imaging optical system according to the second aspect of the present invention, it is preferable that the first lens group is constituted by negative lenses entirely.

In addition, in the imaging optical system according to the second aspect of the present invention, it is preferable that the second lens group is constituted by positive lenses entirely.

In addition, in the imaging optical systems according to the first and second aspects of the present invention, it is preferable that the second optical system includes a correction group moving along an optical axis of the second optical system at the time of correcting an influence of a fluctuation in a distance on the optical axis from a surface of the second optical system on a most reduced side to the reduced-side conjugate plane.

In a case where the second optical system is provided with the correction group, it is preferable to satisfy the following Conditional Expression (4), and more preferable to satisfy the following Conditional Expression (4-1), $$10.0<fB/|f|<100.0 \tag{4}$$

$$20.0<fB/|f|<70.0 \tag{4-1}$$

where fB is a focal length of the correction group, and f is a focal length of the whole system.

In addition, in a case where the second optical system is provided with the correction group, it is preferable that the correction group is disposed on a most magnified side of the second optical system.

In addition, in a case where the second optical system is provided with the correction group, it is preferable that the correction group consists of a cemented lens having a negative lens and a positive lens cemented in this order from the magnified side.

In addition, in the imaging optical systems according to the first and second aspects of the present invention, it is preferable to satisfy the following Conditional Expression (5), and more preferable to satisfy the following Conditional Expression (5-1), $$4.0<Bf/|f| \tag{5}$$

$$5.0<Bf/|f|<20.0 \tag{5-1}$$

where Bf is a back focus of the whole system, and f is a focal length of the whole system.

In addition, in the imaging optical systems according to the first and second aspects of the present invention, it is preferable that the first optical system and the second optical system have a common optical axis.

In addition, in the imaging optical systems according to the first and second aspects of the present invention, it is preferable that the intermediate image has an image plane curvature on the second optical system side in its peripheral portion rather than a center of an optical axis.

According to the present invention, there is provided a projection-type display apparatus comprising: a light source; a light valve on which light from the light source is incident; and the imaging optical system of the present invention as an imaging optical system that projects an optical image of light optically modulated by the light valve onto a screen.

According to the present invention, there is provided an imaging apparatus comprising the imaging optical system of the present invention.

Meanwhile, the term "magnified side" means a projected side (screen side), and the screen side is assumed to be referred to as the magnified side, for the sake of convenience, even in a case of reduction projection. On the other hand, the term "reduced side" means an image display device side (light valve side), and the light valve side is assumed to be referred to as the reduced side, for the sake of convenience, even in a case of reduction projection.

In addition, the term "consist of" is intended to be allowed to include lenses having substantially no power, optical elements, such as a mirror, a diaphragm, a mask, cover glass, or a filter having no power, other than a lens, and the like, in addition to the things enumerated as components.

In addition, the term "lens group" is not necessarily constituted by a plurality of lenses, but may be constituted by only one lens.

In addition, regarding the "back focus", it is considered that the magnified side and the reduced side are equivalent to an object side and an image side of a general imaging lens, respectively, and the magnified side and the reduced side are set to a front side and a back side, respectively.

In addition, the surface shape of the lens and the sign of the refractive power thereof are assumed to be those in a paraxial region in a case where an aspherical surface is included.

In addition, in the calculation of the conditional expressions, the "focal length f of the whole system" is set to a value when a projection distance is set to be infinite.

According to a first aspect of the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a focus group moving along an optical axis of the first optical system during focusing is included between a most magnified side of the first optical system and a position at which a principal ray of light having a maximum angle of view and the optical axis of the first optical system intersect each other, and the following Conditional Expression (1) is satisfied. Therefore, it is possible to form an imaging optical system, having high performance, in which image plane curvature based on focusing is satisfactorily corrected with a wide angle while suppressing cost.

$$10.0 < |fA/f| < 500.0 \tag{1}$$

According to a second aspect of the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a section between a most magnified side of the first optical system and a position at which a principal ray of light having a maximum angle of view and an optical axis of the first optical system intersect each other consists of a first lens group having a negative refractive power and a second lens group, having a positive refractive power, which consists of two single lenses, in order from the magnified side, focusing is performed by moving any one single lens out of the two single lenses of the second lens group along the optical axis of the first optical system, and the following Conditional Expression (1) is satisfied. Therefore, it is possible to form an imaging optical system, having high performance, in which image plane curvature based on focusing is satisfactorily corrected with a wide angle while suppressing cost.

$$10.0 < |fA/f| < 500.0 \tag{1}$$

Since the projection-type display apparatus of the present invention includes the imaging optical system of the present invention, it is possible to achieve a reduction in the cost of the apparatus, and to project an image having a wide angle and high quality.

Since the imaging apparatus of the present invention includes the imaging optical system of the present invention, it is possible to achieve a reduction in the cost of the apparatus, and to acquire an image having a wide angle and high quality.

BRIEF DESCRIPTION OF THE DRAWINGS

FIG. 5 is a diagram of aberrations of an imaging optical system of Example 1 of the present invention.

FIG. 6 is a diagram of aberrations of an imaging optical system of Example 2 of the present invention.

FIG. 8 is a diagram of aberrations of an imaging optical system of Example 4 of the present invention.

DESCRIPTION OF THE PREFERRED EMBODIMENTS

Figure 1:
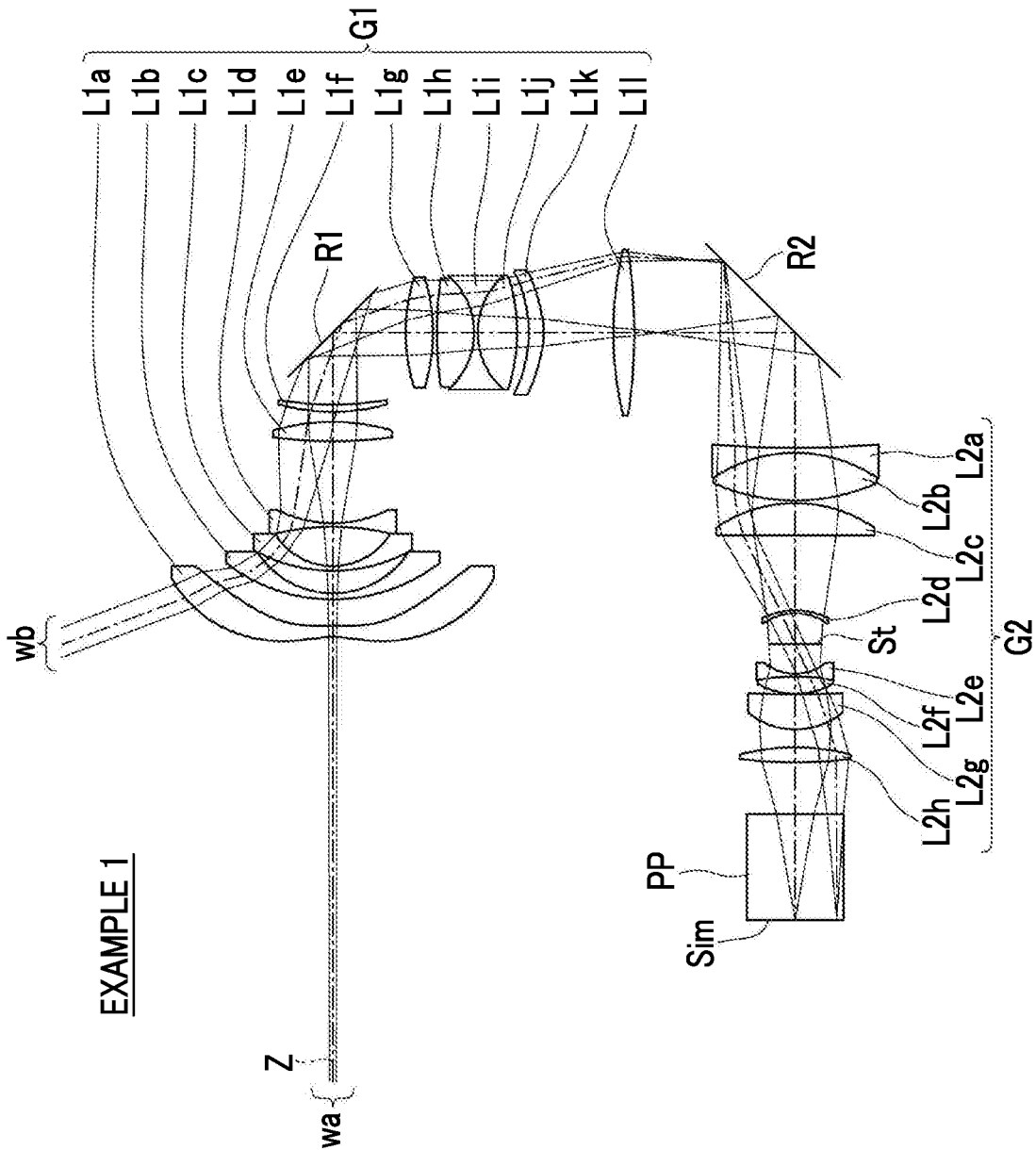
FIG. 1 is a cross-sectional view illustrating a configuration (in common with that of Example 1) of an imaging optical system according to an embodiment of the present invention.

Hereinafter, embodiments of the present invention will be described in detail with reference to the accompanying drawings. FIG. 1 is a cross-sectional view illustrating a configuration of an imaging optical system according to an embodiment of the present invention. The configuration example shown in FIG. 1 is in common with a configuration of an imaging optical system of Example 1 described later. In FIG. 1, an image display surface Sim side is a reduced side, a lens L1a side of a first optical system G1 is a magnified side, and a shown aperture diaphragm St does not necessarily indicates a size or a shape, but indicates a position on an optical axis Z. In addition, in FIG. 1, an on-axis light flux wa and a light flux wb of the maximum angle of view are also shown together.

This imaging optical system is mounted on, for example, a projection-type display apparatus, and can be used in projecting image information displayed on a light valve onto a screen. In FIG. 1, on the assumption of a case of being mounted on the projection-type display apparatus, an optical member PP assumed to be a filter, a prism and the like which are used in a color synthesis portion or an illumination light separation portion, and the image display surface Sim of the light valve located on the surface of the optical member PP on the reduced side are also shown together. In the projection-type display apparatus, a light flux to which image information is given on the image display surface Sim on an image display device is incident on this imaging optical system through the optical member PP, and is projected onto a screen, not shown, by this imaging optical system.

First, an imaging optical system of a first embodiment will be described. As shown in FIG. 1, the imaging optical system of the first embodiment consists of the first optical system G1 constituted by a plurality of lenses and a second optical system G2 constituted by a plurality of lenses, in order from the magnified side. The second optical system G2 is configured to form an image on the image display surface Sim as an intermediate image, and the first optical system G1 is configured to form the intermediate image on a magnified-side conjugate plane.

In an optical system for projection constituted by only an optical system having no normal intermediate image formed thereon, in a case where an attempt is made to widen an angle by reducing a focal length, a lens on the magnified side becomes excessively large in any way. However, in an optical system for projection of a type in which intermediate imaging is performed as in the present embodiment, it is possible to shorten a back focus of the first optical system G1, and to reduce the lens diameters of the first optical system G1 on the magnified side. Therefore, the system is suitable for widening an angle by reducing a focal length.

In addition, a focus group moving along the optical axis of the first optical system G1 during focusing is included between the most magnified side of the first optical system G1 and a position at which a principal ray of light having a maximum angle of view and the optical axis Z of the first optical system G1 intersect each other. Meanwhile, in the present embodiment, a lens L1$f$ is equivalent to the focus group.

In this manner, the position of the focus group is set to be between the most magnified side of the first optical system G1 and a position at which the principal ray of light having a maximum angle of view and the optical axis Z of the first optical system G1 intersect each other, and thus it is possible to dispose the focus group at a relatively high position for an off-axis ray of light. Therefore, a high image plane curvature correction effect for the peripheral portion of a projected image is exhibited.

In addition, it is configured to satisfy the following Conditional Expression (1).

$$10.0 < |fA/f| < 500.0 \quad (1)$$

$$20.0 < |fA/f| < 200.0 \quad (1\text{-}1)$$

$$27.0 < |fA/f| < 90.0 \quad (1\text{-}2)$$

Here, fA is a focal length of a lens moving during focusing (which is equivalent to a focal length of the focus group, and is set to a composite focal length of the entire focus group in a case where the focus group consists of a plurality of lenses), and f is a focal length of the whole system.

A super-wide angle imaging optical system is characterized in that, a fluctuation of focus with respect to a change in projection distance is slight due to a large depth of field around the center of the optical axis, whereas a fluctuation of image plane curvature with respect to a change in projection distance is large in the peripheral portion of a projected image. A conditional expression for satisfactorily correcting image plane curvature caused by this distance fluctuation is (1), and the focus group is disposed at the position while satisfying Conditional Expression (1). Thereby, it is possible to perform correction at a relatively high position for the off-axis ray of light, and to generate an appropriate image plane curvature correction effect. Thereby, even in a case where the number of groups of lenses moving during focusing is one, it is possible to reduce a distortion fluctuation caused by the distance fluctuation, and to satisfactorily correct image plane curvature caused by the distance fluctuation associated with a wide angle.

Conditional Expression (1) is an expression for specifying the ratio of the focal length of the whole system to the focal length of a lens moving during focusing, and the ratio value is not set to be equal to or less than the lower limit of Conditional Expression (1), whereby it is possible to prevent the power of a lens moving during focusing from becoming excessively strong, and to prevent an excessive increase in the amount of focus fluctuation for the amount of movement of a lens moving during focusing around the center of the optical axis. Therefore, it is possible to secure an appropriate amount of movement, and to appropriately correct the image plane curvature of the peripheral portion with respect to a change in projection distance. The ratio value is not set to be equal to or greater than the upper limit of Conditional Expression (1), and thus it is possible to prevent the power of a lens moving during focusing from becoming excessively weak, and to prevent an excessive increase in the amount of movement within a projection range. Therefore, it is possible to prevent an increase in the size of the whole lens system. Meanwhile, in a case where Conditional Expression (1-1), further preferably, Conditional Expression (1-2) is satisfied, it is possible to make characteristics more satisfactory.

In the imaging optical system of the first embodiment, it is preferable that the focus group consists of one single lens. In such a configuration, a configuration with a minimum number required as a lens configuration is formed, which leads to a reduction in cost.

Next, an imaging optical system of a second embodiment will be described. As shown in FIG. 1, the imaging optical system of the second embodiment consists of a first optical system G1 constituted by a plurality of lenses and a second optical system G2 constituted by a plurality of lenses, in order from a magnified side. The second optical system G2 is configured to form an image on the image display device as an intermediate image, and the first optical system G1 is configured to form the intermediate image on the magnified-side conjugate plane. This point is the same as that of the imaging optical system of the first embodiment, and thus the description thereof will not be given.

In addition, a section between the most magnified side of the first optical system G1 and a position at which the principal ray of light having a maximum angle of view and the optical axis Z of the first optical system G1 intersect each other consists of a first lens group having a negative refractive power and a second lens group, having a positive refractive power, which consists of two single lenses, in order from the magnified side, and is configured to perform focusing by moving any one single lens out of the two single lenses of the second lens group along the optical axis of the first optical system G1. Meanwhile, in the present embodiment, the first lens group is constituted by four lenses of lenses L1$a$ to L1$d$, and the second lens group is constituted by two lenses of lenses L1$e$ and L1$f$.

In this manner, the position of a lens moving during focusing is set to be between the most magnified side of the first optical system G1 and a position at which the principal ray of light having a maximum angle of view and the optical axis Z of the first optical system G1 intersect each other, and thus it is possible to dispose the focus group at a relatively high position for an off-axis ray of light. Therefore, a high image plane curvature correction effect for the peripheral portion of a projected image is exhibited. In addition, a section between the most magnified side of the first optical system G1 and a position at which the principal ray of light having a maximum angle of view and the optical axis Z of the first optical system G1 intersect each other is constituted by the first lens group having a negative refractive power and the second lens group having a positive refractive power, in order from the magnified side, and thus it is possible to appropriately correct distortion associated with a super-wide angle, and to reduce distortion fluctuation during movement by performing focusing through the lenses of the second lens group.

In addition, it is configured to satisfy the following Conditional Expression (1). Meanwhile, in a case where the following Conditional Expression (1-1), further preferably, the following Conditional Expression (1-2) is satisfied, it is possible to make characteristics more satisfactory. This point is also the same as that of the imaging optical system of the first embodiment, and thus the description thereof will not be given.

$$10.0 < |fA/f| < 500.0 \quad (1)$$

$$20.0 < |fA/f| < 200.0 \quad (1-1)$$

$$27.0 < |fA/f| < 90.0 \quad (1-2)$$

In the imaging optical system of the second embodiment, it is preferable to satisfy the following Conditional Expressions (2) and (3).

$$-3.0 < f21/|f| < -1.0 \quad (2)$$

$$-2.0 < f21/|f| < -1.2 \quad (2-1)$$

$$5.0 < f22/|f| < 20.0 \quad (3)$$

$$7.0 < f22/|f| < 15.0 \quad (3-1)$$

Here, f21 is a focal length of the first lens group,
f22 is a focal length of the second lens group, and
f is a focal length of the whole system.

Conditional Expression (2) is an expression for specifying the ratio of the focal length of the whole system to the focal length of the first lens group, and the ratio value is not set to be equal to or less than the lower limit of Conditional Expression (2), whereby it is possible to prevent the power of the first lens group from becoming excessively weak, and to prevent an excessive increase in the outside diameter of the first lens group located on the most magnified side, which leads to contribution to a reduction in the size of the whole lens system. The ratio value is not set to be equal to or greater than the upper limit of Conditional Expression (2), and thus it is possible to prevent the power of the first lens group from becoming excessively strong, and to prevent an excessive increase in various aberrations inclusive of distortion which is generated in the first lens group. Therefore, it is possible to make it easy to perform correction in other groups.

Conditional Expression (3) is an expression for specifying the ratio of the focal length of the whole system to the focal length of the second lens group, and the ratio value is not set to be equal to or less than the lower limit of Conditional Expression (3), whereby it is possible to prevent the power of the second lens group from becoming excessively strong, and to prevent the angle of incidence on a lens group on the reduced side rather than the second lens group from becoming excessively strict. Therefore, it is possible to make it easy to perform aberration correction in the lens group on the reduced side rather than the second lens group. The ratio value is not set to be equal to or greater than the upper limit of Conditional Expression (3), and thus it is possible to prevent the power of the second lens group from becoming excessively weak. Therefore, it is possible to prevent a defect such as an increase in the size of the lens group on the reduced side rather than the second lens group from occurring.

Meanwhile, in a case where Conditional Expressions (2) and (3) are satisfied and then Conditional Expression (2-1) and/or (3-1) is further satisfied, it is possible to make characteristics more satisfactory.

In addition, in the imaging optical system of the second embodiment, it is preferable that the first lens group is constituted by negative lenses entirely. With such a configuration, it is possible to secure a negative refractive power required for a wide angle, and to appropriately correct image plane curvature.

In addition, in the imaging optical system of the second embodiment, it is preferable that the second lens group is constituted by positive lenses entirely. With such a configuration, it is possible to secure an appropriate positive refractive power.

In addition, in the imaging optical system of the first and second embodiments, it is preferable that the second optical system G2 includes a correction group moving along the optical axis of the second optical system G2 at the time of correcting the influence of a fluctuation in a distance on the optical axis Z from the surface of the second optical system G2 on the most reduced side to the reduced-side conjugate plane (image display surface Sim). Meanwhile, in the first and second embodiments, two lenses of lenses L2a and L2b are equivalent to the correction group.

In a case where there is a flange back error of a non-negligible amount when the super-wide angle imaging optical system is mounted in the projection-type display apparatus, a conjugate position deviates from a position assumed in design. Therefore, even when this conjugate position is attempted to be adjusted by the focus group, the focus group is not able to perform the adjustment due to a slight focus fluctuation around the center of the optical axis, but a correction group capable of separate focus correction is provided within the second optical system G2, and thus it is possible to adjust positional deviation at the conjugate position.

In addition, similarly, in a case where a focus fluctuation is generated in accordance with a change in the ambient temperature of the projection-type display apparatus, even when this focus fluctuation is attempted to be adjusted by the focus group, the focus group is not able to perform the adjustment due to a slight focus fluctuation around the center of the optical axis, but a correction group capable of separate focus correction is provided within the second optical system G2, and thus it is possible to perform focus correction for the temperature change.

In a case where the second optical system G2 is provided with a correction group, it is preferable to satisfy the following Conditional Expression (4). Conditional Expression (4) is an expression for specifying the ratio of the focal length of the whole system to the focal length of the correction group, and the ratio value is not set to be equal to or less than the lower limit of Conditional Expression (4), whereby it is possible to prevent the power of the correction group from becoming excessively strong, and to prevent an excessive increase in the amount of peripheral image plane change required as the correction group. Therefore, it is possible to suppress an image plane collapse during correction. The ratio value is not set to be equal to or greater than the upper limit of Conditional Expression (4), and thus it is possible to prevent the power of the correction group from becoming excessively weak, and to prevent an excessive increase in the amount of movement for correction which leads to contribution to a reduction in the size of the whole lens system. Meanwhile, in a case where the following Conditional Expression (4-1) is satisfied, it is possible to make characteristics more satisfactory.

$$10.0 < fB/|f| < 100.0 \tag{4}$$

$$20.0 < fB/|f| < 70.0 \tag{4-1}$$

Here, fB is a focal length of the correction group, and f is a focal length of the whole system.

In addition, in a case where the second optical system G2 is provided with a correction group, it is preferable that the correction group is disposed on the most magnified side of the second optical system G2. With such an aspect, since light from the second optical system G2 is caused to incident on the first optical system G1 side, the light is incident on the correction group at a relatively gentle angle of a ray of light, and thus it is possible to reduce a change in the image plane curvature of a peripheral portion.

In addition, in a case where the second optical system G2 is provided with a correction group, it is preferable that the correction group consists of a cemented lens having a negative lens and a positive lens cemented in this order from the magnified side. The cemented lens of a negative lens and a positive lens is formed in this manner, and thus it is possible to appropriately correct on-axis chromatic aberration which is a problem in an optical system having an intermediate image formed therein.

In addition, in the imaging optical systems of the first and second embodiments, it is preferable to satisfy the following Conditional Expression (5). Conditional Expression (5) is an expression for specifying the ratio of the focal length of the whole system to the back focus of the whole system, and the ratio value is not set to be equal to or less than the lower limit of Conditional Expression (5), whereby it is possible to prevent difficulty in disposing a color synthesis prism or the like due to an excessive reduction in the back focus. The ratio value is not set to be equal to or greater than the upper limit of Conditional Expression (5), and thus it is possible to prevent an increase in the size of the whole lens system inclusive of the back focus. Meanwhile, in a case where the following Conditional Expression (5-1) is satisfied, it is possible to make characteristics more satisfactory.

$$4.0 < Bf/|f| \tag{5}$$

$$5.0 < Bf/|f| < 20.0 \tag{5-1}$$

Here, Bf is a back focus of the whole system, and f is a focal length of the whole system.

In addition, in the imaging optical systems of the first and second embodiments, it is preferable that the first optical system G1 and the second optical system G2 have a common optical axis. With such a configuration, the structure of the entire optical system can be simplified, and thus it is possible to contribute to a reduction in cost.

In addition, in the imaging optical systems of the first and second embodiments, it is preferable that the intermediate image has an image plane curvature on the second optical system G2 side in its peripheral portion rather than the center of an optical axis. In this manner, aberration correction is not performed independently in the first optical system G1 and the second optical system G2, but distortion, astigmatism and the like are caused to remain in the second optical system G2, and aberration correction in which these aberrations are offset in the first optical system G1 is performed. Thereby, it is possible to improve various aberrations while achieving a wide angle even using a small number of lenses.

Meanwhile, as shown in FIG. 1, the imaging optical system of the present embodiment may include first optical path bending means R1 for bending an optical path on a reflecting surface in the first optical system G1, and include second optical path bending means R2 for bending an optical path on a reflecting surface between the first optical system G1 and the second optical system G2. In this manner, optical path bending means is disposed at the intermediate position of the imaging optical system, and thus it is possible to achieve a further reduction in the size of the optical path bending means than in a case where the optical path bending means is disposed on the magnified side of the imaging optical system. In addition, two optical path bending means are provided in the imaging optical system, and thus it is easy to reduce the size of the entire imaging optical system and to control a projection direction.

Next, numerical value examples of the imaging optical system of the present invention will be described.

First, an imaging optical system of Example 1 will be described. FIG. 1 shows a cross-sectional view illustrating a configuration of the imaging optical system of Example 1. Meanwhile, in FIG. 1 and FIGS. 2 to 4 corresponding to Examples 2 to 4 described later, an image display surface Sim side is a reduced side, a lens L1a side of a first optical system G1 is a magnified side, and a shown aperture diaphragm St does not necessarily indicates a size or a shape, but indicates a position on the optical axis Z. In addition, in FIGS. 1 to 4, an on-axis light flux wa and a light flux wb of the maximum angle of view are also shown together.

The imaging optical system of Example 1 is constituted by the first optical system G1 including the first optical path bending means R1, the second optical path bending means R2, and the second optical system G2, in order from the magnified side. The first optical system G1 is constituted by twelve lenses of lenses L1a to L1l, and the second optical system G2 is constituted by eight lenses of lenses L2a to L2h. Meanwhile, in Example 1, the lens L1f is equivalent to a focus group, and two lenses of the lens L2a and L2b are equivalent to a correction group.

Table 1 shows lens data of the imaging optical system of Example 1, Table 2 shows data relating to surface spacings having a change in spacing during focusing, Table 3 shows data relating to specifications, and Table 4 shows data relating to aspherical coefficients. In the following, the meanings of symbols in the tables will be described by taking an example of those in Example 1, but the same is basically true of Examples 2 to 4.

In the lens data of Table 1, the column of a surface number indicates surface numbers sequentially increasing toward the reduced side with the surface of a component on the most magnified side set to a first surface, the column of a radius of curvature indicates radii of curvature of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm), and the column of v indicates Abbe numbers of the respective optical elements with respect to the d line (wavelength of 587.6 nm). Here, the sign of the radius of curvature is set to be positive in a case where a surface shape is convex on the magnified side, and is set to be negative in a case where a surface shape is convex on the reduced side. The lens data also indicates the aperture diaphragm St and the optical member PP together. In the place of a surface number of a surface equivalent to the aperture diaphragm St, a term of (diaphragm) is written together with the surface number. In addition, in the lens data, DD [surface number] is written in the places of surface spacings having a change in spacing during focusing. Numerical values corresponding to DD [surface number] shown in Table 2.

The data relating to specifications of Table 3 indicates values a focal length f, a back focus Bf, an F-Number FNo, and the total angle of view 2ω when a projection distance is set to 193.406.

Meanwhile, numerical values shown in data relating to basic lens data and specifications are standardized so that the focal length of the whole system at the projection distances of the specifications is set to −1. In addition, the numerical values of each table are rounded off to predetermined decimal places.

In the lens data of Table 1, mark * is attached to the surface number of an aspherical surface, and the numerical values of a paraxial radius of curvature are indicated as the radius of curvature of the aspherical surface. The data relating to the aspherical coefficients of Table 4 indicates surface numbers of the aspherical surfaces and aspherical coefficients relating to these aspherical surfaces. "E−n" (n is an integer) in the numerical values of the aspherical coefficients of Table 4 means "×10$^{-n}$". The aspherical coefficients are values of respective coefficients KA and Am (m=3 to 20) in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial radius of curvature, and KA and Am are aspherical coefficients (m=3 to 20).

TABLE 1

Example 1: Lens data (n and ν are based on the d line)

| SURFACE NUMBER | RADIUS OF CURVATURE | SURFACE SPACING | n | ν |
|---|---|---|---|---|
| *1 | −5.2258 | 0.7360 | 1.53158 | 55.08 |
| *2 | −14.4830 | 1.6688 | | |
| 3 | 10.9737 | 0.3937 | 1.83481 | 42.72 |
| 4 | 5.6865 | 1.4329 | | |
| 5 | 10.0545 | 0.2995 | 1.91082 | 35.25 |
| 6 | 4.2275 | 2.5121 | | |
| 7 | −15.2778 | 0.2311 | 1.72916 | 54.68 |
| 8 | 7.6744 | 5.2322 | | |
| 9 | 28.2991 | 1.2357 | 1.80610 | 33.27 |
| 10 | −13.1238 | DD[10] | | |
| 11 | 12.6584 | 0.4655 | 1.84666 | 23.78 |
| 12 | 19.8736 | DD[12] | | |
| 13 | 12.0143 | 1.7218 | 1.49700 | 81.61 |
| 14 | −12.0143 | 0.2516 | | |
| 15 | 24.8613 | 2.3517 | 1.67790 | 55.34 |
| 16 | −4.8915 | 0.2311 | 1.80518 | 25.46 |
| 17 | 4.8915 | 2.4852 | 1.49700 | 81.61 |
| 18 | −12.0513 | 0.7514 | | |
| *19 | −7.1510 | 0.9414 | 1.51007 | 56.24 |
| *20 | −5.3495 | 4.4056 | | |
| 21 | 22.9057 | 1.3282 | 1.84666 | 23.78 |
| 22 | −34.7748 | 17.5452 | | |
| 23 | −64.7115 | 0.3252 | 1.80610 | 33.27 |
| 24 | 9.2416 | 3.0414 | 1.63854 | 55.38 |
| 25 | −12.6122 | 0.1712 | | |
| 26 | 8.7758 | 2.0539 | 1.69680 | 55.53 |
| 27 | ∞ | 4.7924 | | |
| 28 | 4.6731 | 0.1729 | 1.59270 | 35.31 |
| 29 | 3.4032 | 1.9837 | | |
| 30 (DIAPHRAGM) | ∞ | 1.8913 | | |
| 31 | −3.0344 | 0.1712 | 1.80518 | 25.46 |
| 32 | 12.6113 | 1.1057 | 1.59282 | 68.62 |
| 33 | −4.8375 | 0.0342 | | |
| 34 | −57.4762 | 2.2421 | 1.49700 | 81.61 |

TABLE 1-continued

Example 1: Lens data (n and ν are based on the d line)

| SURFACE NUMBER | RADIUS OF CURVATURE | SURFACE SPACING | n | ν |
|---|---|---|---|---|
| 35 | −4.7173 | 1.1502 | | |
| 36 | 13.8428 | 0.9568 | 1.92286 | 20.88 |
| 37 | −27.2944 | 3.2889 | | |
| 38 | ∞ | 6.7786 | 1.51633 | 64.14 |
| 39 | ∞ | | | |

First optical path bending means: position of 4.6212 on magnified side from surface number 13

Second optical path bending means: position of 7.3597 on magnified side from surface number 23

TABLE 2

Example 1: Surface spacings

| | PROJECTION DISTANCE | | | |
|---|---|---|---|---|
| | 193.406 | 121.521 | 468.967 | ∞ |
| DD[10] | 0.6421 | 0.8789 | 0.3986 | 0.2225 |
| DD[12] | 9.2180 | 8.9812 | 9.4615 | 9.6376 |

TABLE 3

Example 1: Specifications (d line)

| | |
|---|---|
| f | −1.00 |
| Bf | 7.76 |
| FNo. | 1.91 |
| 2ω [°] | 138.0 |

TABLE 4

Example 1: Aspherical coefficients

| | SURFACE NUMBER | |
|---|---|---|
| | 1 | 2 |
| KA | −1.546378300122E+00 | −6.938246778737E+01 |
| A3 | 2.018863389167E−02 | 3.135869415357E−02 |
| A4 | 3.047810683562E−03 | −2.989646897191E−02 |
| A5 | −1.669807535484E−03 | 3.677207805828E−02 |
| A6 | 1.154294171845E−04 | −2.990889576397E−02 |
| A7 | 3.249222906876E−05 | 1.666983136218E−02 |
| A8 | −4.253102539216E−06 | −6.627516042915E−03 |
| A9 | −4.424038232000E−07 | 1.914682928514E−03 |
| A10 | 8.245832143873E−08 | −4.053401733698E−04 |
| A11 | 4.288038152692E−09 | 6.288867705223E−05 |
| A12 | −1.009517143718E−09 | −7.077805600361E−06 |
| A13 | −3.928910017049E−11 | 5.629944648839E−07 |
| A14 | 9.188892344839E−12 | −2.997619234324E−08 |
| A15 | 2.854707126548E−13 | 9.489436391692E−10 |
| A16 | −6.073887356486E−14 | −1.286239784502E−11 |
| A17 | −1.058687065632E−15 | 1.516543284299E−14 |
| A18 | 2.357443732956E−16 | −4.670276371805E−15 |
| A19 | 1.116119782618E−18 | −3.190130207468E−17 |
| A20 | −3.658215332719E−19 | 1.042364006359E−17 |

| | SURFACE NUMBER | |
|---|---|---|
| | 19 | 20 |
| KA | −4.260756389852E−01 | 5.923802980090E−01 |
| A3 | −5.094545177229E−03 | −4.049535376063E−03 |
| A4 | 1.311855979326E−02 | 1.205983297241E−02 |
| A5 | −5.611217310945E−03 | −3.710237995376E−03 |
| A6 | −1.633075426131E−03 | −6.446587800793E−04 |

TABLE 4-continued

Example 1: Aspherical coefficients

| | | |
|---|---|---|
| A7 | 2.434226410868E−03 | 9.705857875631E−04 |
| A8 | −3.423229558501E−04 | −1.036740768513E−04 |
| A9 | −4.527267198745E−04 | −1.481035527610E−04 |
| A10 | 1.544918621372E−04 | 3.796487747518E−05 |
| A11 | 3.707454554667E−05 | 1.139864470430E−05 |
| A12 | −2.337823471038E−05 | −5.114123231341E−06 |
| A13 | −2.029922108751E−07 | −1.533820057677E−07 |
| A14 | 1.728137683772E−06 | 3.274692501526E−07 |
| A15 | −1.756408094208E−07 | −3.329005538927E−08 |
| A16 | −5.970062664704E−08 | −8.904987889237E−09 |
| A17 | 1.113194098830E−08 | 1.988014493344E−09 |
| A18 | 5.447426702441E−10 | 1.706750172651E−11 |
| A19 | −2.180703780510E−10 | −3.433778947339E−11 |
| A20 | 1.042467028344E−11 | 2.361405547132E−12 |

FIG. 5 shows a diagram of aberrations of the imaging optical system of Example 1. Meanwhile, FIG. 5 shows an aberration diagram at three projection distances, and shows spherical aberration, astigmatism, distortion, and lateral chromatic aberration, in order from the left side in FIG. 5. The diagram of aberrations indicating spherical aberration, astigmatism, and distortion indicates aberrations in which the d line (wavelength of 587.6 nm) is used as a reference wavelength. In the spherical aberration diagram, aberrations relating to the d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberrations in a sagittal direction and a tangential direction are indicated by a solid line and a short dashed line, respectively. In the lateral chromatic aberration diagram, aberrations relating to the C line (wavelength of 656.3 nm) and the F line (wavelength of 486.1 nm) are indicated by a long dashed line and a short dashed line, respectively. FNo. in the spherical aberration diagram means an F-Number, and ω in the other aberration diagrams means a half angle of view.

In the description of Example 1, symbols, meanings, and description methods of the respective pieces of data are the same as those in the following examples unless otherwise noted, and thus the repeated description thereof will be omitted below.

Figure 2:
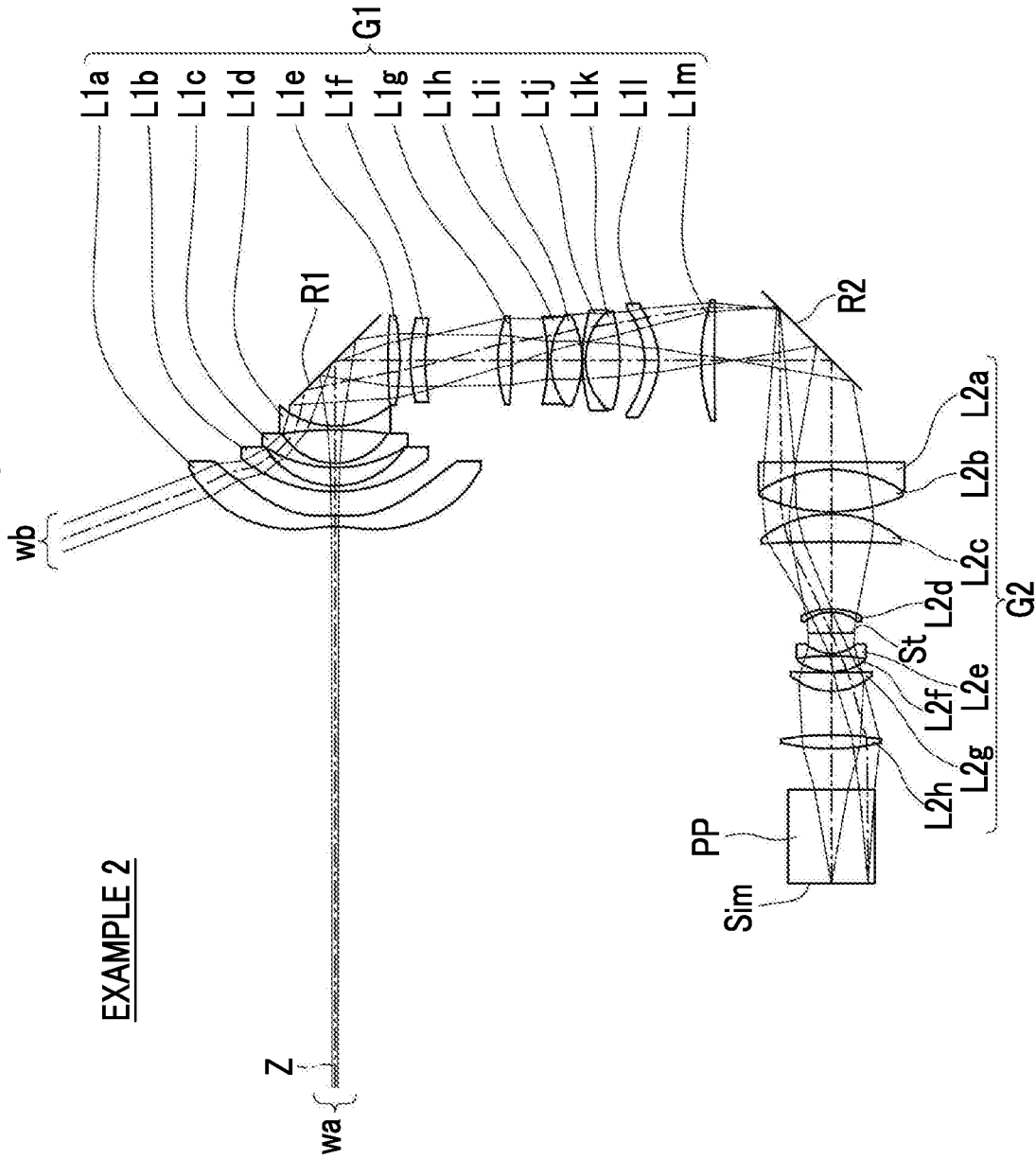
FIG. 2 is a cross-sectional view illustrating a configuration of an imaging optical system of Example 2 of the present invention.

Next, an imaging optical system of Example 2 will be described. FIG. 2 shows a cross-sectional view illustrating a configuration of the imaging optical system of Example 2. The imaging optical system of Example 2 has the same lens number configuration as that in Example 1, except that a first optical system G1 is constituted by thirteen lenses of lenses L1a to L1m. Meanwhile, in Example 2, the lens L1f is equivalent to a focus group, and two lenses of the lens L2a and L2b are equivalent to a correction group. In addition, Table 5 shows lens data of the imaging optical system of Example 2, Table 6 shows data relating to surface spacings having a change in spacing during focusing, Table 7 shows data (projection distance of 193.295) relating to specifications, Table 8 shows data relating to aspherical coefficients, and FIG. 6 shows a diagram of aberrations.

TABLE 5

Example 2: Lens data (n and ν are based on the d line)

| SURFACE NUMBER | RADIUS OF CURVATURE | SURFACE SPACING | n | ν |
|---|---|---|---|---|
| *1 | −5.8964 | 0.7697 | 1.53158 | 55.08 |
| *2 | −19.0272 | 1.7458 | | |
| 3 | 10.5522 | 0.4275 | 1.83481 | 42.72 |

TABLE 5-continued

Example 2: Lens data (n and ν are based on the d line)

| SURFACE NUMBER | RADIUS OF CURVATURE | SURFACE SPACING | n | ν |
|---|---|---|---|---|
| 4 | 5.9178 | 1.3190 | | |
| 5 | 9.2704 | 0.3079 | 1.91082 | 35.25 |
| 6 | 4.4226 | 2.4107 | | |
| 7 | −27.0447 | 0.2736 | 1.72916 | 54.68 |
| 8 | 6.0293 | 8.5528 | | |
| 9 | 39.7995 | 0.8362 | 1.85478 | 24.80 |
| 10 | −18.8770 | DD[10] | | |
| 11 | 12.1277 | 1.0582 | 1.67270 | 32.10 |
| 12 | 17.7260 | DD[12] | | |
| 13 | 10.2472 | 0.9655 | 1.59282 | 68.62 |
| 14 | −33.5356 | 2.5904 | | |
| 15 | −12.5421 | 0.2222 | 1.84666 | 23.78 |
| 16 | 5.5094 | 2.2232 | 1.59282 | 68.62 |
| 17 | −7.4156 | 0.0343 | | |
| 18 | 12.7105 | 0.2310 | 1.80610 | 33.27 |
| 19 | 4.8440 | 2.4475 | 1.49700 | 81.61 |
| 20 | −13.1174 | 1.7674 | | |
| *21 | −5.2479 | 1.0265 | 1.49100 | 57.58 |
| *22 | −4.2922 | 3.0320 | | |
| 23 | 13.7187 | 0.9529 | 1.60311 | 60.64 |
| 24 | 248.4579 | 15.7258 | | |
| 25 | 887.4293 | 0.5473 | 1.80610 | 33.27 |
| 26 | 9.2682 | 3.0347 | 1.63854 | 55.38 |
| 27 | −12.1294 | 0.1709 | | |
| 28 | 8.0168 | 2.0069 | 1.69680 | 55.53 |
| 29 | 95.7147 | 4.8487 | | |
| 30 | 4.8446 | 0.2347 | 1.51823 | 58.90 |
| 31 | 2.9545 | 1.5201 | | |
| 32 (DIAPHRAGM) | ∞ | 1.4622 | | |
| 33 | −2.6701 | 0.1711 | 1.80518 | 25.46 |
| 34 | 15.8216 | 1.1524 | 1.59282 | 68.62 |
| 35 | −4.1529 | 0.0343 | | |
| 36 | −103.6182 | 1.3648 | 1.49700 | 81.61 |
| 37 | −4.3229 | 3.1657 | | |
| 38 | 21.2137 | 0.9847 | 1.89286 | 20.36 |
| 39 | −15.6497 | 2.9778 | | |
| 40 | ∞ | 6.7747 | 1.51633 | 64.14 |
| 41 | ∞ | | | |

First optical path bending means: position of 3.8000 on magnified side from surface number 9

Second optical path bending means: position of 7.3597 on magnified side from surface number 25

TABLE 6

Example 2: Surface spacings

| | PROJECTION DISTANCE | | | |
|---|---|---|---|---|
| | 193.295 | 121.451 | 468.698 | ∞ |
| DD[10] | 0.7737 | 1.1055 | 0.4276 | 0.2351 |
| DD[12] | 5.2162 | 4.8844 | 5.5622 | 5.7548 |

TABLE 7

Example 2: Specifications (d line)

| | |
|---|---|
| f | −1.00 |
| Bf | 7.44 |
| FNo. | 1.90 |
| 2ω [°] | 138.0 |

TABLE 8

Example 2: Aspherical coefficients

| | SURFACE NUMBER | |
|---|---|---|
| | 1 | 2 |
| KA | −1.357388515823E+00 | −1.628705953313E+02 |
| A3 | 1.927223012565E−02 | 3.029280339983E−02 |
| A4 | 3.032368752960E−03 | −2.929320826337E−02 |
| A5 | −1.506190100574E−03 | 3.613072695399E−02 |
| A6 | 9.506883602698E−05 | −2.912223249063E−02 |
| A7 | 2.618753686429E−05 | 1.613112510106E−02 |
| A8 | −3.274595508840E−06 | −6.390039784950E−03 |
| A9 | −2.708318424928E−07 | 1.839206630851E−03 |
| A10 | 5.399476858819E−08 | −3.875341524841E−04 |
| A11 | 1.243165325042E−09 | 5.982210646736E−05 |
| A12 | −4.868622112842E−10 | −6.703214580094E−06 |
| A13 | −3.450374509225E−12 | 5.314457382805E−07 |
| A14 | 2.907940846136E−12 | −2.818732297750E−08 |
| A15 | 2.728310764023E−14 | 8.821667497129E−10 |
| A16 | −1.363243197962E−14 | −1.152486466342E−11 |
| A17 | −9.061680430869E−17 | 4.504417927048E−14 |
| A18 | 4.141531333035E−17 | −7.137718299741E−15 |
| A19 | −2.037231248508E−19 | −1.135101977250E−16 |
| A20 | −3.888230406881E−20 | 1.734292816851E−17 |

| | SURFACE NUMBER | |
|---|---|---|
| | 21 | 22 |
| KA | −4.872660163080E−01 | 2.890408453906E−01 |
| A3 | −4.313575825854E−03 | −3.811459499198E−03 |
| A4 | 1.183477893311E−02 | 1.167539328340E−02 |
| A5 | −6.204842748578E−03 | −3.596675902214E−03 |
| A6 | −4.219268119035E−04 | −1.997788696869E−04 |
| A7 | 2.504562678536E−03 | 8.418635798564E−04 |
| A8 | −9.814946777821E−04 | −2.474019158694E−04 |
| A9 | −3.295964197407E−04 | −1.041215110012E−04 |
| A10 | 3.112587726762E−04 | 7.019370236742E−05 |
| A11 | −1.797276271584E−05 | −5.487063314035E−07 |
| A12 | −4.163302763662E−05 | −9.069695280540E−06 |
| A13 | 9.569956896154E−06 | 1.760467224084E−06 |
| A14 | 2.508650748425E−06 | 5.294245003396E−07 |
| A15 | −1.047793586811E−06 | −1.944781073089E−07 |
| A16 | −3.185471439407E−08 | −7.598939014681E−09 |
| A17 | 5.005748741167E−08 | 8.692281104953E−09 |
| A18 | −3.088940997418E−09 | −4.542863465574E−10 |
| A19 | −9.105469700661E−10 | −1.434299223039E−10 |
| A20 | 1.013077405010E−10 | 1.407504975244E−11 |

Figure 3:
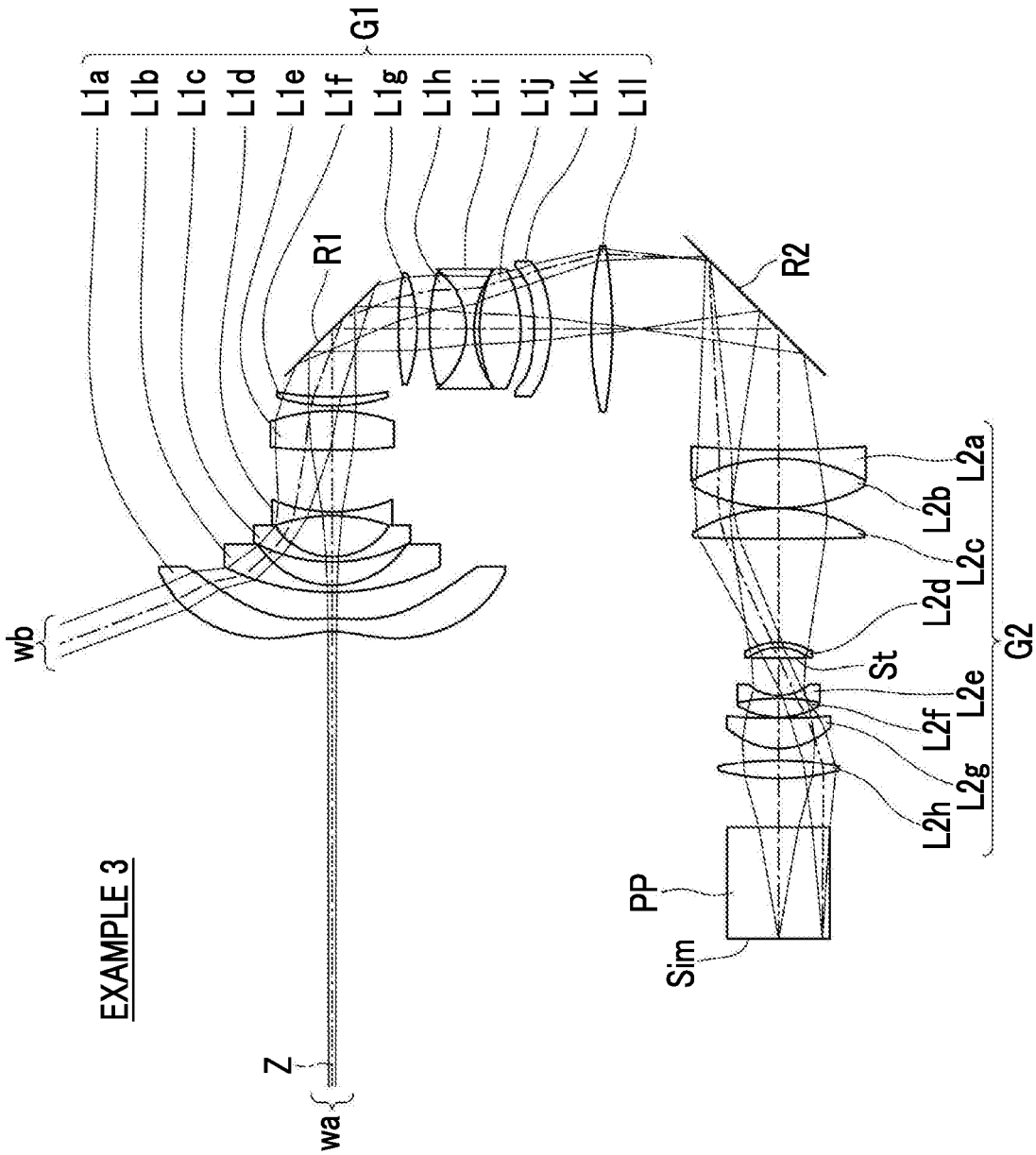
FIG. 3 is a cross-sectional view illustrating a configuration of an imaging optical system of Example 3 of the present invention.
Figure 7:
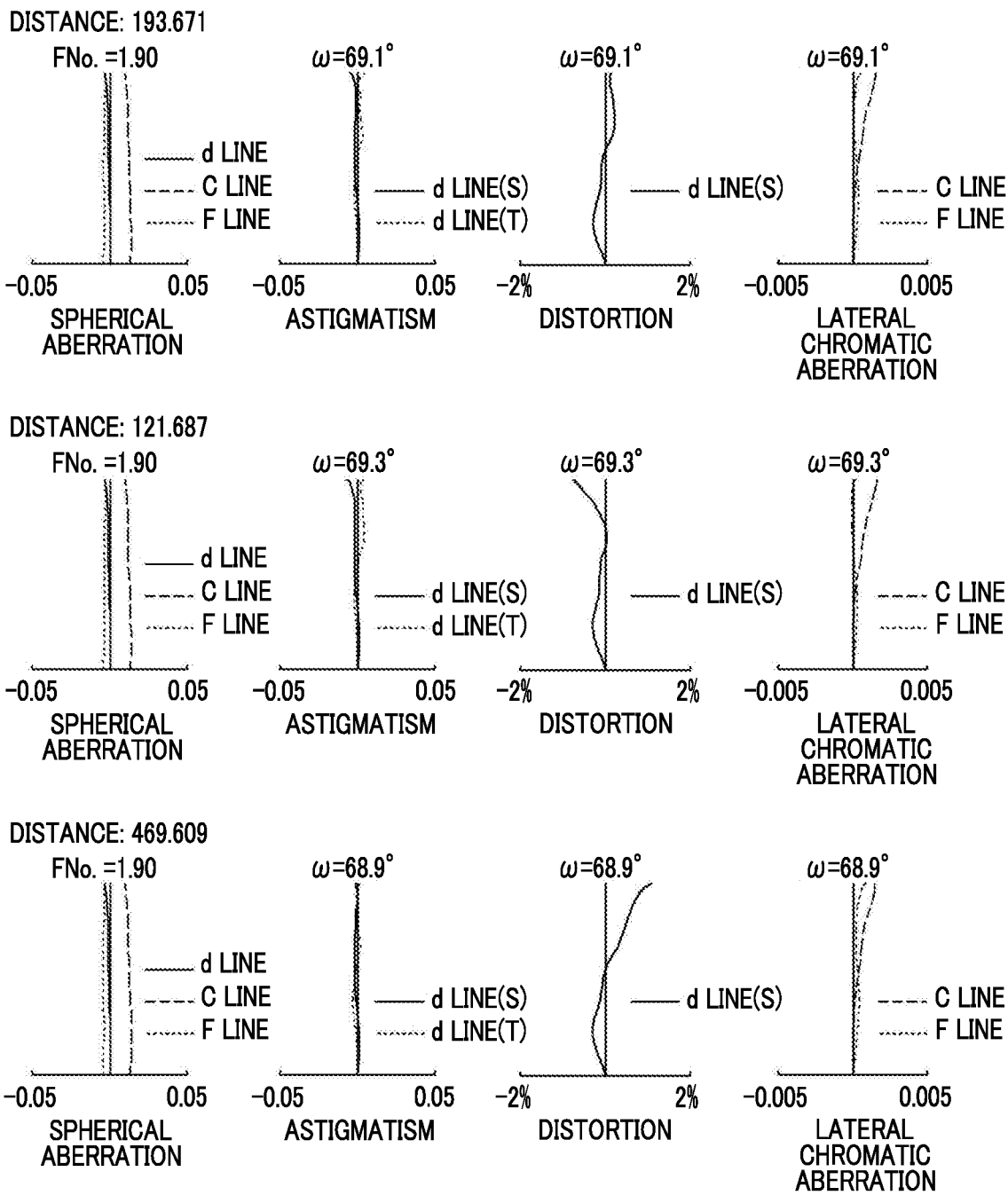
FIG. 7 is a diagram of aberrations of an imaging optical system of Example 3 of the present invention.

Next, an imaging optical system of Example 3 will be described. FIG. 3 shows a cross-sectional view illustrating a configuration of the imaging optical system of Example 3. The imaging optical system of Example 3 has the same lens number configuration as that in Example 1. Meanwhile, in Example 3, the lens L1f is equivalent to a focus group, and two lenses of the lens L2a and L2b are equivalent to a correction group. In addition, Table 9 shows lens data of the imaging optical system of Example 3, Table 10 shows data relating to surface spacing having a change in spacing during focusing, Table 11 shows data (projection distance of 193.671) relating to specifications, Table 12 shows data relating to aspherical coefficients, and FIG. 7 shows a diagram of aberrations.

TABLE 9

Example 3: Lens data (n and ν are based on the d line)

| SURFACE NUMBER | RADIUS OF CURVATURE | SURFACE SPACING | n | ν |
|---|---|---|---|---|
| *1 | −5.2679 | 0.7886 | 1.53158 | 55.08 |
| *2 | −14.4837 | 1.6094 | | |
| 3 | 14.4269 | 0.4283 | 1.80400 | 46.58 |

TABLE 9-continued

Example 3: Lens data (n and ν are based on the d line)

| SURFACE NUMBER | RADIUS OF CURVATURE | SURFACE SPACING | n | ν |
|---|---|---|---|---|
| 4 | 5.3246 | 1.4216 | | |
| 5 | 9.9512 | 0.3085 | 1.77250 | 49.60 |
| 6 | 4.0739 | 2.5062 | | |
| 7 | −10.2914 | 0.2399 | 1.65160 | 58.55 |
| 8 | 9.3608 | 3.7475 | | |
| 9 | 37.0181 | 2.3995 | 1.80400 | 46.58 |
| 10 | −11.0039 | DD[10] | | |
| 11 | 11.0652 | 0.5429 | 1.84666 | 23.78 |
| 12 | 18.7534 | DD[12] | | |
| 13 | 21.8698 | 1.1159 | 1.49700 | 81.61 |
| 14 | −9.9062 | 0.7627 | | |
| 15 | 12.5838 | 2.2148 | 1.69680 | 55.53 |
| 16 | −4.6116 | 0.4839 | 1.80518 | 25.46 |
| 17 | 6.0895 | 0.3177 | | |
| 18 | 8.6388 | 2.5000 | 1.43700 | 95.10 |
| 19 | −7.9833 | 0.7952 | | |
| *20 | −9.6064 | 1.0218 | 1.49100 | 57.58 |
| *21 | −6.4360 | 2.4281 | | |
| 22 | 22.5414 | 1.2808 | 1.84666 | 23.78 |
| 23 | −30.7133 | 17.3990 | | |
| 24 | −71.4789 | 0.5486 | 1.80518 | 25.46 |
| 25 | 10.9590 | 3.0029 | 1.54814 | 45.78 |
| 26 | −10.9703 | 0.0343 | | |
| 27 | 9.9129 | 1.8354 | 1.77250 | 49.60 |
| 28 | −198.7757 | 6.3127 | | |
| 29 | 3.9214 | 0.3132 | 1.59270 | 35.31 |
| 30 | 2.9492 | 0.6395 | | |
| 31 (DIAPHRAGM) | ∞ | 2.2905 | | |
| 32 | −2.8164 | 0.1712 | 1.80518 | 25.46 |
| 33 | 12.1319 | 1.1510 | 1.59282 | 68.62 |
| 34 | −4.6750 | 0.0341 | | |
| 35 | −55.9787 | 1.8633 | 1.49700 | 81.61 |
| 36 | −4.4699 | 0.7306 | | |
| 37 | 17.3160 | 1.1278 | 1.80809 | 22.76 |
| 38 | −13.9766 | 2.9848 | | |
| 39 | ∞ | 6.7879 | 1.51633 | 64.14 |
| 40 | ∞ | | | |

First optical path bending means: position of 4.0000 on magnified side from surface number 13

Second optical path bending means: position of 7.3597 on magnified side from surface number 24

TABLE 10

Example 3: Surface spacings

| | PROJECTION DISTANCE | | | |
|---|---|---|---|---|
| | 193.671 | 121.687 | 469.609 | ∞ |
| DD[10] | 0.3071 | 0.4716 | 0.1391 | 0.0247 |
| DD[12] | 8.1439 | 7.9794 | 8.3119 | 8.4263 |

TABLE 11

Example 3: Specifications (d line)

| | |
|---|---|
| f | −1.00 |
| Bf | 7.46 |
| FNo. | 1.90 |
| 2ω [°] | 138.2 |

TABLE 12

Example 3: Aspherical coefficients

| | SURFACE NUMBER | |
|---|---|---|
| | 1 | 2 |
| KA | −1.012705640654E+00 | −1.689574187807E+01 |
| A3 | 1.313590672786E−02 | 2.625714192873E−02 |
| A4 | 3.458547259924E−03 | −2.918484051266E−02 |
| A5 | −1.169940041077E−03 | 3.522343197266E−02 |
| A6 | 7.995291899452E−05 | −2.811366556401E−02 |
| A7 | 1.329980564441E−05 | 1.554819820242E−02 |
| A8 | −2.528111542635E−06 | −6.125563888498E−03 |
| A9 | 1.577910217721E−08 | 1.750330429076E−03 |
| A10 | 3.246425142892E−08 | −3.666602131150E−04 |
| A11 | −2.591118868451E−09 | 5.635341131715E−05 |
| A12 | −1.267895828965E−10 | −6.282206550636E−06 |
| A13 | 2.533086230711E−11 | 4.940977488554E−07 |
| A14 | −4.773445370840E−13 | −2.597779016162E−08 |
| A15 | −7.638974957206E−14 | 8.188069220170E−10 |
| A16 | 3.421892629020E−15 | −1.169316115120E−11 |
| A17 | | |

| | SURFACE NUMBER | |
|---|---|---|
| | 20 | 21 |
| KA | 1.000000000000E+00 | 1.000000000000E+00 |
| A3 | 0.000000000000E+00 | 0.000000000000E+00 |
| A4 | 9.537933590180E−03 | 1.316545003836E−02 |
| A5 | −4.365562964921E−03 | −4.314758970233E−03 |
| A6 | −1.287307806987E−03 | −8.622339325173E−04 |
| A7 | 9.665869678069E−04 | 5.831904153225E−04 |
| A8 | 5.179981299709E−05 | 3.852474426708E−05 |
| A9 | −1.268083459315E−04 | −5.290146200922E−05 |
| A10 | 2.254629098072E−06 | −5.448014657821E−06 |
| A11 | 1.032307039569E−05 | 4.252855788801E−06 |
| A12 | −3.685019140456E−07 | 5.151727389511E−07 |
| A13 | −5.269014256841E−07 | −2.575206369834E−07 |
| A14 | 1.561792860958E−08 | −2.064528339338E−08 |
| A15 | 1.585353323634E−08 | 8.899463097362E−09 |
| A16 | −1.606044033084E−10 | 3.025861351437E−10 |
| A17 | 2.163240404893E−10 | −1.257240698682E−10 |

Figure 4:
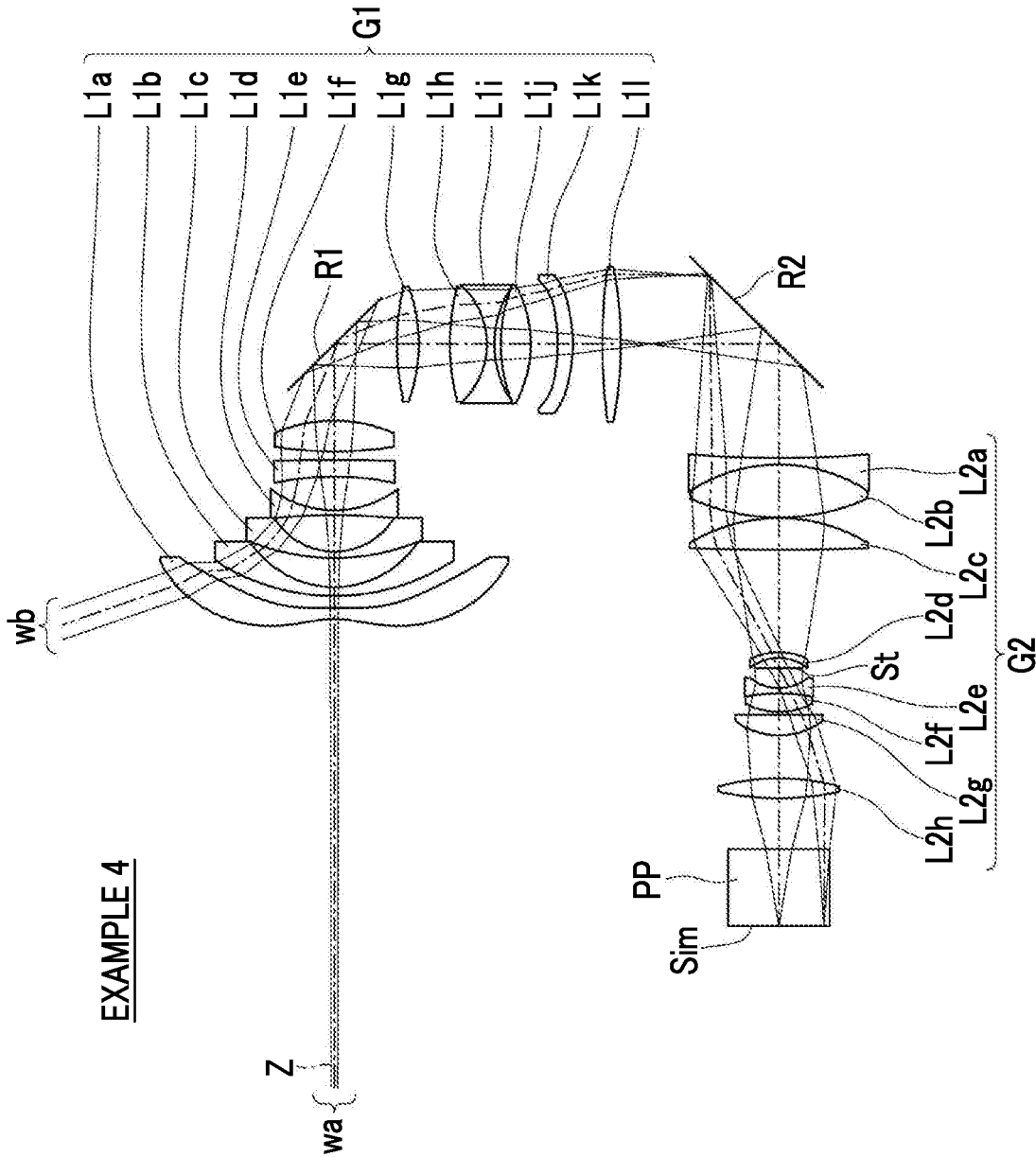
FIG. 4 is a cross-sectional view illustrating a configuration of an imaging optical system of Example 4 of the present invention.

Next, an imaging optical system of Example 4 will be described. FIG. 4 shows a cross-sectional view illustrating a configuration of the imaging optical system of Example 4. The imaging optical system of Example 4 has the same lens number configuration as that in Example 4. Meanwhile, in Example 4, the lens L1e is equivalent to a focus group, and two lenses of the lens L2a and L2b are equivalent to a correction group. In addition, Table 13 shows lens data of the imaging optical system of Example 4, Table 14 shows data relating to surface spacings having a change in spacing during focusing, Table 15 shows data (projection distance of 218.526) relating to specifications, Table 16 shows data relating to aspherical coefficients, and FIG. 8 shows a diagram of aberrations.

TABLE 13

Example 4: Lens data (n and ν are based on the d line)

| SURFACE NUMBER | RADIUS OF CURVATURE | SURFACE SPACING | n | ν |
|---|---|---|---|---|
| *1 | −5.2611 | 0.7159 | 1.49100 | 57.58 |
| *2 | −23.2691 | 0.7687 | | |
| 3 | 13.8526 | 0.5759 | 1.80400 | 46.58 |
| 4 | 6.3768 | 1.8739 | | |
| 5 | 14.1436 | 0.4171 | 1.83400 | 37.16 |
| 6 | 4.4561 | 2.3492 | | |
| 7 | −40.3818 | 0.3177 | 1.67790 | 55.34 |
| 8 | 6.7298 | DD[8] | | |
| *9 | −53.7443 | 1.0874 | 1.49100 | 57.58 |
| *10 | 165.9761 | DD[10] | | |
| 11 | 24.9817 | 1.9866 | 1.72825 | 28.46 |
| 12 | −9.4218 | 8.9432 | | |
| 13 | 16.0529 | 1.4018 | 1.59282 | 68.62 |
| 14 | −10.8960 | 1.9895 | | |
| 15 | 14.7193 | 2.3635 | 1.67790 | 55.34 |
| 16 | −5.1814 | 0.4769 | 1.80518 | 25.42 |
| 17 | 6.7146 | 0.4155 | | |
| 18 | 10.2639 | 1.9082 | 1.49700 | 81.61 |
| 19 | −8.1363 | 1.7222 | | |
| *20 | −10.8826 | 0.9865 | 1.49100 | 57.58 |
| *21 | −7.3100 | 1.8762 | | |
| 22 | 37.0896 | 1.1785 | 1.84666 | 23.78 |
| 23 | −26.6303 | 17.4730 | | |
| 24 | −69.8886 | 0.4172 | 1.80518 | 25.46 |
| 25 | 10.3042 | 3.4185 | 1.65412 | 39.68 |
| 26 | −13.7004 | 0.0399 | | |
| 27 | 10.8976 | 2.0532 | 1.80400 | 46.58 |
| 28 | −128.0519 | 6.6040 | | |
| 29 | 4.0970 | 0.3764 | 1.59551 | 39.24 |
| 30 | 2.9427 | 0.6475 | | |
| 31 (DIAPHRAGM) | ∞ | 1.2913 | | |
| 32 | −2.9434 | 0.3508 | 1.80518 | 25.46 |
| 33 | 11.3463 | 1.1823 | 1.59282 | 68.62 |
| 34 | −4.6691 | 0.1888 | | |
| 35 | 576.6335 | 1.3327 | 1.49700 | 81.61 |
| 36 | −4.6531 | 2.7712 | | |
| 37 | 14.2916 | 1.2849 | 1.80809 | 22.76 |
| 38 | −17.7908 | 3.2827 | | |
| 39 | ∞ | 4.9665 | 1.51633 | 64.14 |
| 40 | ∞ | | | |

First optical path bending means: position of 4.0000 on magnified side from surface number 13

Second optical path bending means: position of 7.3597 on magnified side from surface number 24

TABLE 14

Example 4: Surface spacings

| | PROJECTION DISTANCE | | | |
|---|---|---|---|---|
| | 218.526 | 139.062 | 496.650 | ∞ |
| DD[8] | 2.1515 | 2.1004 | 2.2023 | 2.2360 |
| DD[10] | 0.5617 | 0.6128 | 0.5109 | 0.4772 |

TABLE 15

Example 4: Specifications (d line)

| | |
|---|---|
| f | −1.00 |
| Bf | 6.56 |
| FNo. | 2.00 |
| 2ω [°] | 141.4 |

TABLE 16

Example 4: Aspherical coefficients

| | SURFACE NUMBER | | |
|---|---|---|---|
| | 1 | 2 | 9 |
| KA | -1.184822379989E+00 | -9.305091755351E+00 | 1.000000000000E+00 |
| A3 | 1.353926642623E-02 | 2.331979447198E-02 | 0.000000000000E+00 |
| A4 | 2.707370023394E-03 | -2.218985135714E-02 | -5.581491907410E-03 |
| A5 | -1.038047151568E-03 | 2.394248809711E-02 | 1.512855814874E-03 |
| A6 | 7.194239679813E-05 | -1.742432881295E-02 | 3.856836520332E-04 |
| A7 | 1.241019733918E-05 | 8.779831191611E-03 | -2.966384618176E-04 |
| A8 | -2.039449304051E-06 | -3.148133571114E-03 | 1.508994218778E-05 |
| A9 | -3.681062833536E-08 | 8.185434134924E-04 | 2.416079204512E-05 |
| A10 | 2.514643919693E-08 | -1.560531061097E-04 | -3.591373691427E-06 |
| A11 | -1.050815973077E-09 | 2.183069046758E-05 | -7.153566056398E-07 |
| A12 | -1.216488499144E-10 | -2.215039367107E-06 | 1.395382953556E-07 |
| A13 | 1.082205811148E-11 | 1.585481861804E-07 | 0.000000000000E+00 |
| A14 | 4.468710291553E-14 | -7.586168113523E-09 | 0.000000000000E+00 |
| A15 | -3.051813389213E-14 | 2.176411525459E-10 | 0.000000000000E+00 |
| A16 | 8.806800800421E-16 | -2.829959985566E-12 | 0.000000000000E+00 |
| A17 | | | 0.000000000000E+00 |

| | SURFACE NUMBER | | |
|---|---|---|---|
| | 10 | 20 | 21 |
| KA | 1.000000000000E+00 | 1.000000000000E+00 | 1.000000000000E+00 |
| A3 | 0.000000000000E+00 | 0.000000000000E+00 | 0.000000000000E+00 |
| A4 | -3.037217813671E-03 | 7.187220762451E-03 | 1.011569072187E-02 |
| A5 | 9.188176967567E-04 | -3.375610460888E-03 | -3.737609978392E-03 |
| A6 | 2.557113678440E-04 | -6.432858936485E-04 | -1.352207282381E-04 |
| A7 | -1.871304047322E-04 | 6.685934706683E-04 | 4.056913937342E-04 |
| A8 | 9.007609190640E-06 | -1.441841120614E-05 | -5.308926499444E-05 |
| A9 | 1.524769208219E-05 | -7.466465354350E-05 | -2.175482638087E-05 |
| A10 | -2.318467197874E-06 | 6.836998479944E-06 | 4.147662164765E-06 |
| A11 | -4.336238649110E-07 | 5.040451669491E-06 | 6.054858367578E-07 |
| A12 | 8.588271661949E-08 | -6.207252742956E-07 | -1.435524287456E-07 |
| A13 | 0.000000000000E+00 | -2.092327772822E-07 | -7.104840043680E-09 |
| A14 | 0.000000000000E+00 | 2.568304693879E-08 | 2.703143598466E-09 |
| A15 | 0.000000000000E+00 | 4.956740181054E-09 | -1.010400387283E-11 |
| A16 | 0.000000000000E+00 | -3.916452762377E-10 | -2.281502662944E-11 |
| A17 | 0.000000000000E+00 | -5.090809233527E-11 | 6.281902700895E-13 |

Table 17 shows values corresponding to Conditional Expressions (1) to (5) of the imaging optical systems of Examples 1 to 4. Meanwhile, the d line is used as a reference wavelength in all the examples, and values shown in the following Table 17 are equivalent to those at this reference wavelength.

TABLE 17

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | |fA/f| | 39.62 | 52.55 | 30.63 | -82.61 |
| (2) | f21/|f| | -1.58 | -1.73 | -1.57 | -1.59 |
| (3) | f22/|f| | 8.78 | 11.57 | 7.97 | 9.64 |
| (4) | fB/|f| | 43.08 | 26.67 | 53.02 | 41.28 |
| (5) | Bf/|f| | 7.68 | 7.37 | 7.40 | 6.56 |

From the above-mentioned data, it can be understood that the imaging optical systems of Examples 1 to 4 all satisfy Conditional Expressions (1) to (5), and are imaging optical systems, having high performance, in which the half angle of view ω is a wide angle equal to or greater than 65° and image plane curvature based on focusing is satisfactorily corrected, while suppressing cost.

Figure 9:
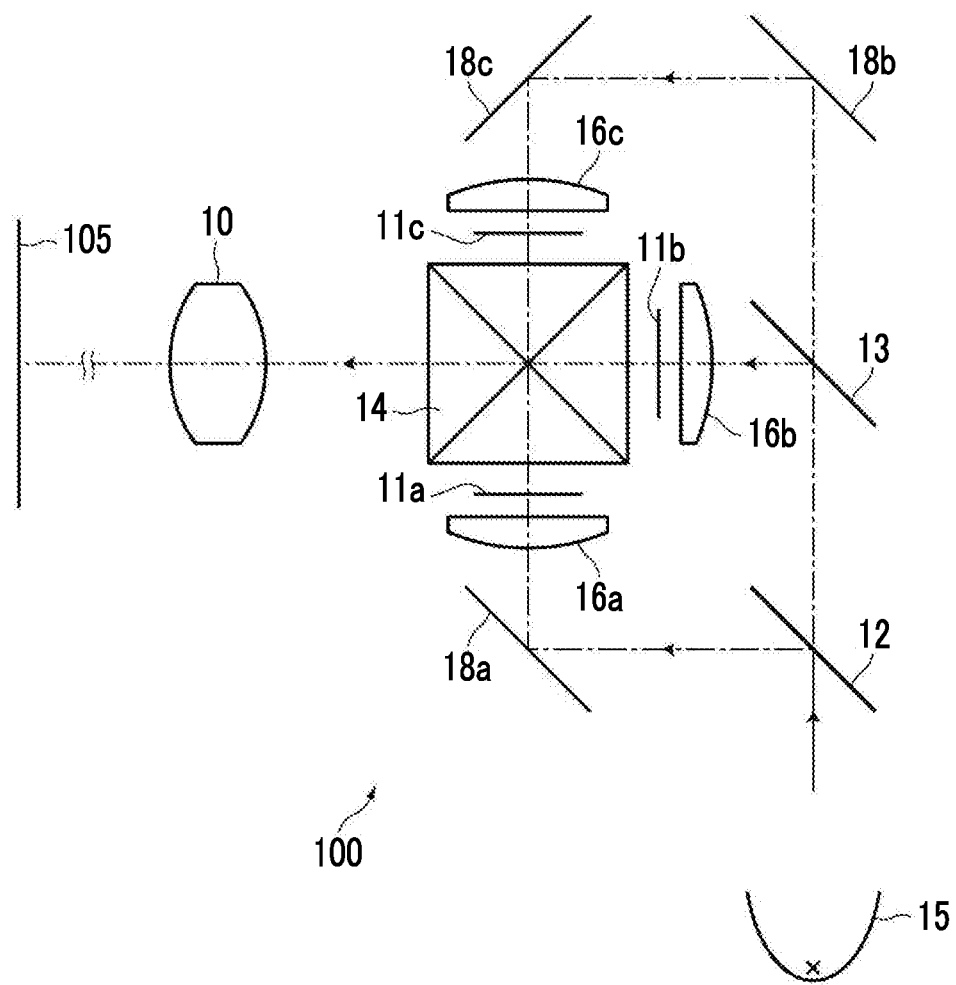
FIG. 9 is a schematic configuration diagram of a projection-type display apparatus according to an embodiment of the present invention.

Next, a projection-type display apparatus according to an embodiment of the present invention will be described. FIG. 9 is a schematic configuration diagram of a projection-type display apparatus according to the embodiment of the present invention. A projection-type display apparatus 100 shown in FIG. 9 includes an imaging optical system 10 according to an embodiment of the present invention, a light source 15, transmission-type display devices 11a to 11c as light valves corresponding to respective beams of colored light, dichroic mirrors 12 and 13 for color decomposition, a cross dichroic prism 14 for color synthesis, capacitor lenses 16a to 16c, and total reflection mirrors 18a to 18c for deflecting an optical path. Meanwhile, in FIG. 9, the imaging optical system 10 is schematically shown. In addition, an integrator is disposed between the light source 15 and the dichroic mirror 12, but is not shown in FIG. 9.

White light from the light source 15 is decomposed into three colored light fluxes (G light, B light, and R light) by the dichroic mirrors 12 and 13. The decomposed light fluxes are then incident on the transmission-type display devices 11a to 11c corresponding to the respective colored light fluxes through the capacitor lenses 16a to 16c, respectively, and are optically modulated. The modulated light fluxes are color-synthesized by the cross dichroic prism 14, and then are incident on the imaging optical system 10. The imaging optical system 10 projects an optical image of light optically modulated by the transmission-type display devices 11a to 11c onto a screen 105.

Figure 10:
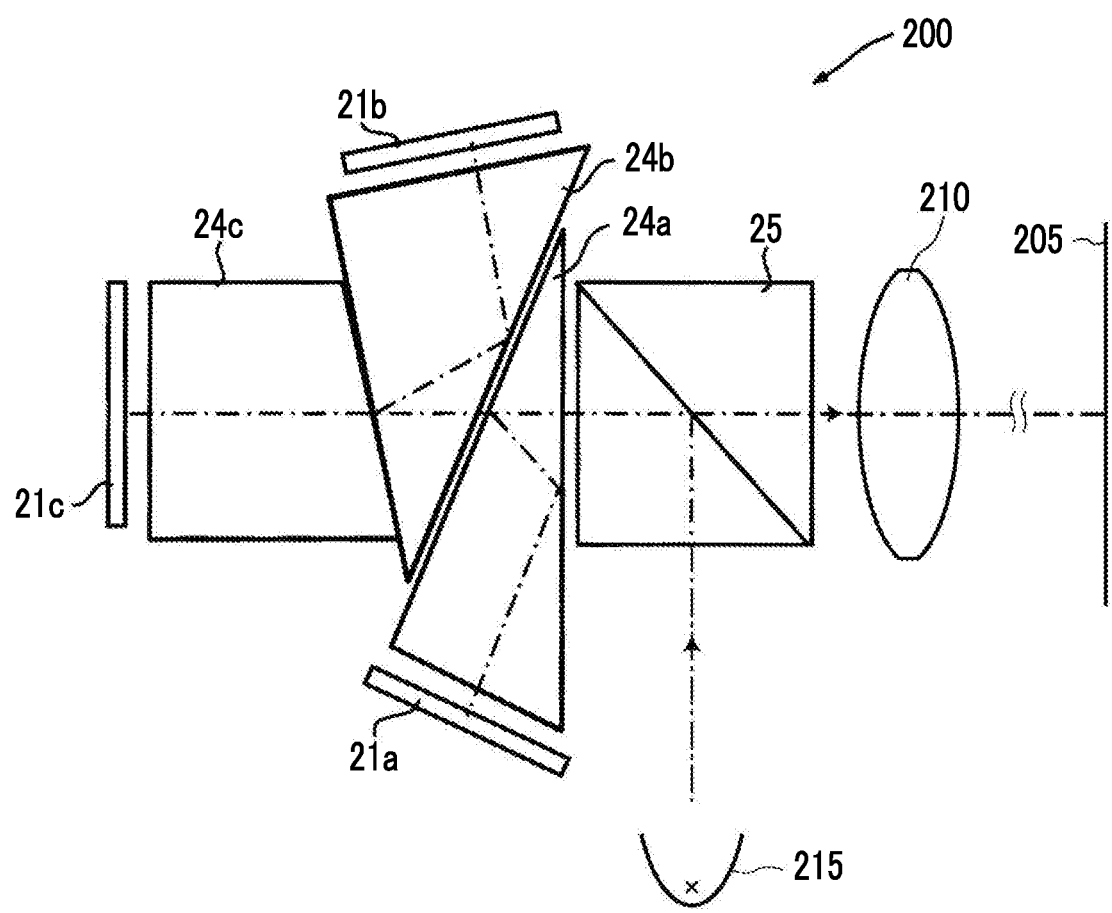
FIG. 10 is a schematic configuration diagram of a projection-type display apparatus according to another embodiment of the present invention.

FIG. 10 is a schematic configuration diagram of a projection-type display apparatus according to another embodiment of the present invention. A projection-type display apparatus 200 shown in FIG. 10 includes an imaging optical system 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light. Meanwhile, in FIG. 10, the imaging optical system 210 is schematically shown. In addition, an integrator is disposed between the light source 215 and the polarization separation prism 25, but is not shown in FIG. 10.

White light from the light source 215 is reflected from a reflecting surface inside the polarization separation prism 25, and then is decomposed into three colored light fluxes (G light, B light, and R light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the imaging optical system 210. The imaging optical system 210 projects an optical image of light optically modulated by the DMDs 21a to 21c onto a screen 205.

Figure 11:
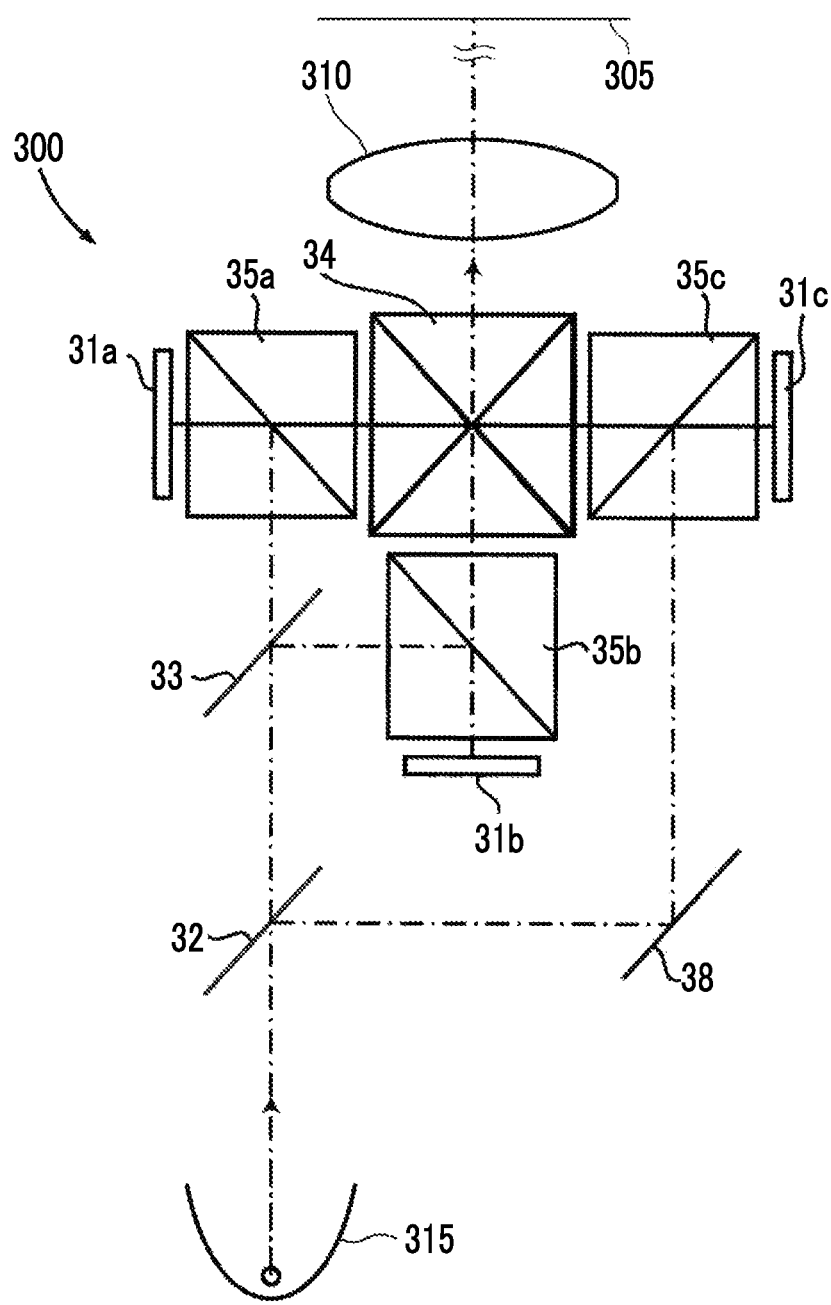
FIG. 11 is a schematic configuration diagram of a projection-type display apparatus according to still another embodiment of the present invention.

FIG. 11 is a schematic configuration diagram of a projection-type display apparatus according to still another embodiment of the present invention. A projection-type display apparatus 300 shown in FIG. 11 includes an imaging optical system 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c. Meanwhile, in FIG. 11, the imaging optical system 310 is schematically shown. In addition, an integrator is disposed between the light source 315 and the dichroic mirror 32, but is not shown in FIG. 11.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the imaging optical system 310. The imaging optical system 310 projects an optical image of light optically modulated by the reflection-type display devices 31a to 31c onto a screen 305.

Figure 12:
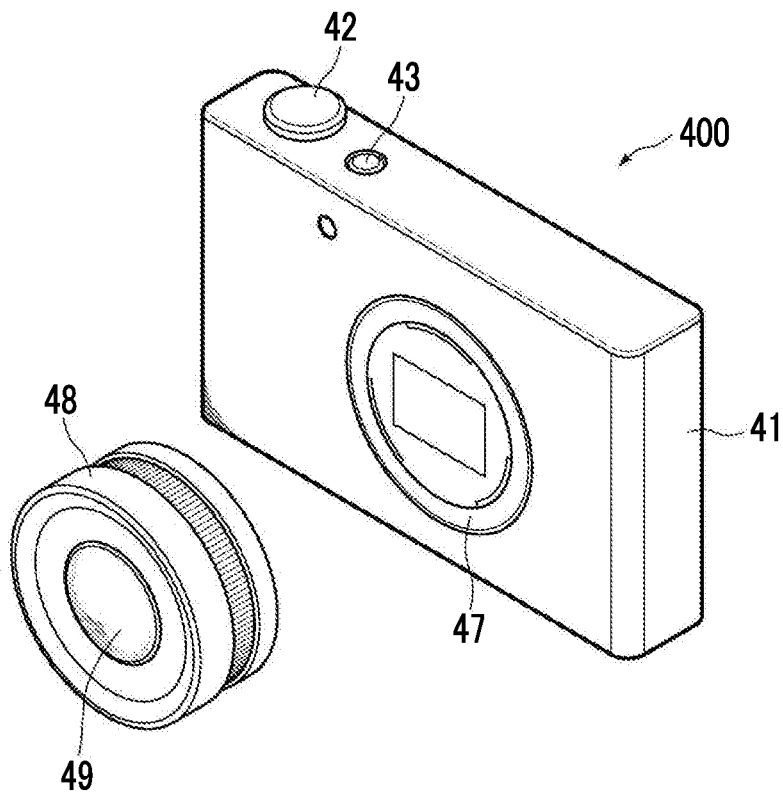
FIG. 12 is a perspective view of a front side of an imaging apparatus according to an embodiment of the present invention.
Figure 13:
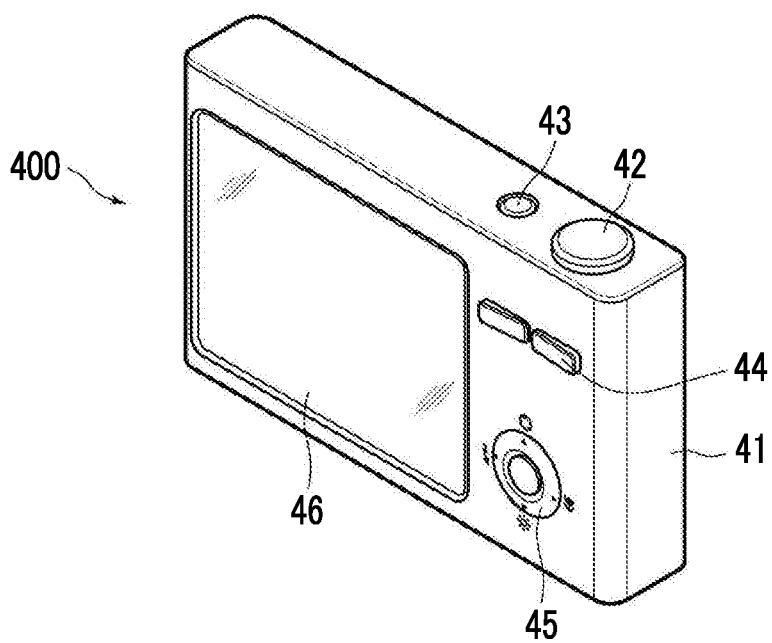
FIG. 13 is a perspective view of a rear surface side of the imaging apparatus shown in FIG. 12.

FIGS. 12 and 13 are appearance diagrams of a camera 400 which is an imaging apparatus of an embodiment of the present invention. FIG. 12 shows a perspective view when the camera 400 is seen from the front side, and FIG. 13 is a perspective view when the camera 400 seen from the rear surface side. The camera 400 is a single-lens digital camera, having no reflex finder, which has an interchangeable lens 48 detachably mounted therein. The interchangeable lens 48 has an imaging optical system 49 which is an optical system according to the embodiment of the present invention housed within a lens barrel.

This camera 400 includes a camera body 41, and is provided with a shutter button 42 and a power button 43 on the upper surface of the camera body 41. In addition, operating portions 44 and 45 and a display portion 46 are provided on the rear surface of the camera body 41. The display portion 46 is used for displaying a captured image or an image within an angle of view before image capture.

An imaging aperture on which light from an imaging target is incident is provided on the front central portion of the camera body 41, a mount 47 is provided at a position corresponding to the imaging aperture, and the interchangeable lens 48 is mounted onto the camera body 41 through the mount 47.

The camera body 41 is provided therein with an imaging device (not shown) such as a charge coupled device (CCD) that outputs an imaging signal according to a subject image formed by the interchangeable lens 48, a signal processing circuit that processes the imaging signal which is output from the imaging device to generate an image, a recording medium for recording the generated image, and the like. In this camera 400, a still image or a moving image can be captured by pressing the shutter button 42, and image data obtained by this image capture is recorded in the recording medium.

Hereinbefore, the present invention has been described through embodiments and examples, but the imaging optical systems of the present invention are not limited to those of the above examples, and can be variously modified. For example, it is possible to appropriately change the radius of curvature, the surface spacing, the refractive index, and the Abbe number of each lens.

In addition, the projection-type display apparatuses of the present invention are also not limited to the above configurations. For example, the light valves which are used and the optical members which are used for light flux separation or light flux synthesis are not limited to the above configurations, and can be modified in various forms.

In addition, the imaging apparatus of the present invention is also not limited to the above configuration, and can also be applied to, for example, a single-lens reflex camera, a film camera, a video camera, and the like.

EXPLANATION OF REFERENCES 10, 210, 310: imaging optical system
11a to 11c: transmission-type display device
12, 13, 32, 33: dichroic mirror
14, 34: cross dichroic prism
15, 215, 315: light source
16a to 16c: capacitor lens
18a to 18c, 38: total reflection mirror
21a to 21c: DMD
24a to 24c: TIR prism
25, 35a to 35c: polarization separation prism
31a to 31c: reflection-type display device
41: camera body
42: shutter button
43: power button
44, 45: operating portion
46: display portion
47: mount
48: interchangeable lens 49: imaging optical system
100, 200, 300: projection-type display apparatus
105, 205, 305: screen
400: camera
G1: first optical system
G2: second optical system
L1a to L2h: lens
PP: optical member
R1: first optical path bending means
R2: second optical path bending means
Sim: image display surface
St: aperture diaphragm
wa: on-axis light flux
wb: light flux of maximum angle of view
Z: optical axis

What is claimed is:

1. An imaging optical system capable of projecting an image, displayed on an image display device disposed on a reduced-side conjugate plane, as a magnified image on a magnified-side conjugate plane, the system comprising, in order from a magnified side:
   a first optical system which is constituted by a plurality of lenses; and
   a second optical system which is constituted by a plurality of lenses,
   wherein the second optical system forms the image on the image display device as an intermediate image,
   the first optical system forms the intermediate image on the magnified-side conjugate plane,
   a focus group moving along an optical axis of the first optical system during focusing is included between a most magnified side of the first optical system and a position at which a principal ray of light having a maximum angle of view and the optical axis of the first optical system intersect each other, and
   the following Conditional Expression (1) is satisfied, $$10.0<|fA/f|<500.0 \tag{1}$$

where fA is a focal length of a lens moving during focusing, and
f is a focal length of the whole system.

2. The imaging optical system according to claim 1, wherein the focus group consists of one single lens.

3. The imaging optical system according to claim 1, wherein the second optical system includes a correction group moving along an optical axis of the second optical system at the time of correcting an influence of a fluctuation in a distance on the optical axis from a surface of the second optical system on a most reduced side to the reduced-side conjugate plane.

4. The imaging optical system according to claim 3, wherein the following Conditional Expression (4) is satisfied, $$10.0<fB/|f|<100.0 \tag{4}$$

where fB is a focal length of the correction group.

5. The imaging optical system according to claim 3, wherein the correction group is disposed on a most magnified side of the second optical system.

6. The imaging optical system according to claim 3, wherein the correction group consists of a cemented lens having a negative lens and a positive lens cemented in this order from the magnified side.

7. The imaging optical system according to claim 1, wherein the following Conditional Expression (5) is satisfied, $$4.0<Bf/|f| \tag{5}$$

where Bf is a back focus of the whole system.

8. The imaging optical system according to claim 1, wherein the first optical system and the second optical system have a common optical axis.

9. The imaging optical system according to claim 1, wherein the intermediate image has an image plane curvature on the second optical system side in its peripheral portion rather than a center of an optical axis.

10. The imaging optical system according to claim 1, wherein the following Conditional Expression (1-1) is satisfied, $$20.0<|fA/f|<200.0 \tag{1-1}$$

11. The imaging optical system according to claim 4, wherein the following Conditional Expression (4-1) is satisfied, $$20.0<fB/|f|<70.0 \tag{4-1}$$

12. The imaging optical system according to claim 7, wherein the following Conditional Expression (5-1) is satisfied, $$5.0<Bf/|f|<20.0 \tag{5-1}$$

13. A projection-type display apparatus comprising:
   a light source;
   a light valve on which light from the light source is incident; and
   the imaging optical system according to claim 1 as an imaging optical system that projects an optical image of light optically modulated by the light valve onto a screen.

14. An imaging apparatus comprising the imaging optical system according to claim 1.

15. The imaging optical system according to claim 1, wherein the following Conditional Expression (1-a) is satisfied, $$10.0<|fA/f|<90.0 \tag{1-a}$$

16. The imaging optical system according to claim 15, wherein the following Conditional Expression (1-b) is satisfied, $$10.0<|fA/f|\leq82.61 \tag{1-b}$$

17. The imaging optical system according to claim 16, wherein the following Conditional Expression (1-c) is satisfied, $$10.0<|fA/f|\leq52.55 \tag{1-c}$$

18. The imaging optical system according to claim 7, wherein the following Conditional Expression (5-a) is satisfied, $$4.0<Bf/|f|\leq7.68 \tag{5-a}$$

19. The imaging optical system according to claim 1, wherein a half angle of view is equal to or greater than 65°.

20. The imaging optical system according to claim 1, wherein an optical path bending means is disposed at an intermediate position of the imaging optical system.

21. The imaging optical system according to claim 1, wherein two optical path bending means are provided in the imaging optical system.

* * * * *